US012749205B2

(12) United States Patent
Jain et al.

(10) Patent No.: US 12,749,205 B2
(45) Date of Patent: Sep. 29, 2026

(54) CONCURRENT EDITING FOR VECTOR GRAPHICS

(71) Applicant: Adobe Inc., San Jose, CA (US)

(72) Inventors: Arushi Jain, Delhi (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 338 days.

(21) Appl. No.: 18/543,714

(22) Filed: Dec. 18, 2023

(65) Prior Publication Data

US 2025/0200766 A1 Jun. 19, 2025

(51) Int. Cl.
*G06T 7/30* (2017.01)

(52) U.S. Cl.
CPC ..................................... *G06T 7/30* (2017.01)

(58) Field of Classification Search
CPC ........................................................ G06T 7/30
See application file for complete search history.

(56) References Cited

U.S. PATENT DOCUMENTS 10,200,598 B2 * 2/2019 Penha .................. H04N 23/632
11,055,810 B1 7/2021 Dhingra et al.
11,095,808 B2 * 8/2021 Kim ....................... H04N 23/63
2020/0211148 A1 * 7/2020 Mackinnon ............... G06T 1/20
2022/0215642 A1 * 7/2022 Batra ...................... G06T 19/20
2024/0168604 A1 * 5/2024 Son ....................... G06F 3/0482

OTHER PUBLICATIONS

W. Kabsch. A discussion of the solution for the best rotation to relate two sets of vectors. Acta Crystallographica Section A, 34(5):827-828, Sep. 1978.

* cited by examiner

*Primary Examiner* — Mohammed H Zuberi
(74) *Attorney, Agent, or Firm* — Keller Preece PLLC

(57) ABSTRACT

The present disclosure relates to systems, non-transitory computer-readable media, and methods for identifying modifications to a segment within a vector graphic and contemporaneously propagating the modifications to similar segments within the vector graphic. For example, the disclosed systems detect a selection of an initial segment of a vector graphic. In some embodiments, the disclosed systems determine, in response to the selection, a set of candidate segments of the vector graphic that are within a threshold similarity in relation to the initial segment. In some embodiments, the disclosed systems generate a refined set of candidate segments by pruning, from the set of candidate segments, candidate segments with extensions that fail to satisfy the threshold similarity. Additionally, in response to a user interaction applying a modification to the initial segment, the disclosed systems propagate the modification to the refined set of candidate segments.

20 Claims, 11 Drawing Sheets

CONCURRENT EDITING FOR VECTOR GRAPHICS

BACKGROUND

Recent years have seen significant improvements in systems that modify vector graphics. For example, some existing systems receive client device input to modify segments of a vector graphic by applying each edit to the segment on which it is applied. Some systems have even developed that identify locally repeating geometry within a vector graphic, but such systems require an exact selection of a segment to define position and length of a stencil. Although some conventional systems identify repeating geometry from a precisely defined stencil, these systems have a number of technical deficiencies regarding flexibly determining repeating geometry and efficiently applying vector graphic modifications.

SUMMARY

Embodiments of the present disclosure offer systems, non-transitory computer-readable media, and methods for contemporaneously applying modifications made to one segment of a vector graphic to other, sufficiently similar segments within the vector graphic. In particular, in some embodiments, the disclosed systems identify an initially selected segment within a vector graphic and identify candidate segments that share at least partially similar geometry with the initially selected segment. In some cases, the disclosed systems refine the set of candidate segments by comparing extensions of the initial segment to extensions of the candidate segments using a number of transformation processes, including translation, scale, and rotation. Upon refining the set of candidate segments, in certain embodiments, the disclosed systems apply a modification or an augmentation of the initially selected segment to the segments within the refined set of candidate segments. Indeed, in some cases, the disclosed systems apply modifications to the refined set of candidate segments contemporaneously or extemporaneously with client device interactions (e.g., in real time) making modifications to the initial segment. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
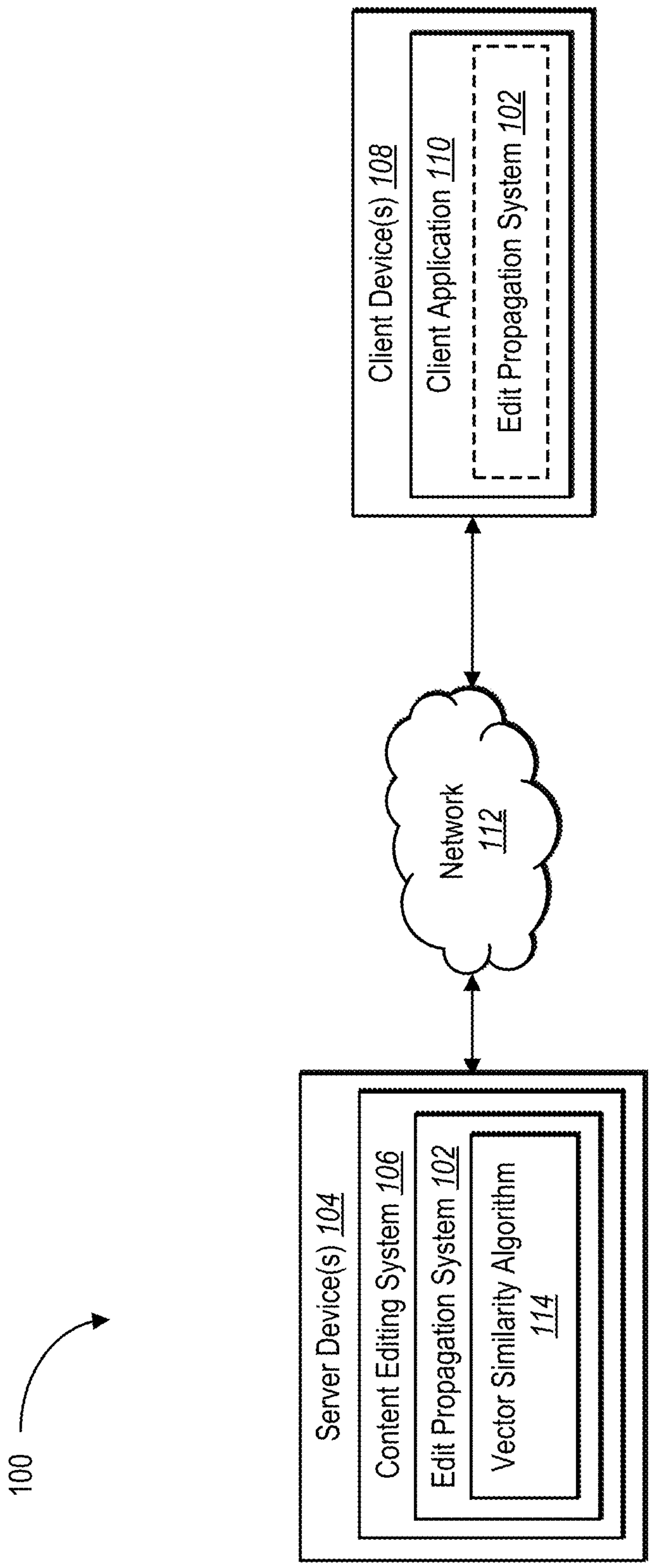
FIG. 1 illustrates an example system environment in which an edit propagation system operates in accordance with one or more embodiments.

This disclosure describes one or more embodiments of an edit propagation system that contemporaneously applies modifications made to one segment of a vector graphic to similar segments in the vector graphic. In some embodiments, the edit propagation system identifies an initial segment in a vector graphic based on an approximate user selection, where the selection is approximate in that it is a selection of a segment between two anchor points along a spline of the vector graphic without necessarily defining exact parameters such as position and length. In some cases, the edit propagation system uses characteristics of the initial segment as a foundation to search for similar segments. For example, the edit propagation system generates a set of candidate segments with similar geometry to the initial segment by transforming and comparing segments of the vector graphic to the initial segment. In some cases, the edit propagation system also generates a refined set of candidate segments by comparing extended versions of the initial segment to extended versions of the candidate segments. Furthermore, in some embodiments, the edit propagation system propagates modifications made to the initial segment to segments in the refined set of candidate segments.

As just mentioned, in some embodiments, the edit propagation system identifies an initial segment of a vector graphic based on an approximate user selection. To elaborate, instead of requiring an exact length and/or position of a segment as some prior systems do, the edit propagation system generates modifications to vector graphics based on more approximate (e.g., less exact) input from a client device, such as a hover of a cursor over (or near) a segment in a vector graphic. In some cases, the edit propagation system thus receives an approximate selection (e.g., a click or a hover) of a segment between two anchor points of a spline within a vector graphic. The edit propagation system further receives client device interactions for modifying the segment and propagates the modifications to similar segments.

To facilitate propagating modifications to similar segments, in one or more embodiments, the edit propagation system uses the initial segment to identify similar segments within the vector graphic. For example, the edit propagation system utilizes anchor points and control points that define the initial segment as a foundation for comparing against other segments of the vector graphic. In some embodiments, the edit propagation system generates a set of candidate segments by comparing the initial segment to the remaining segments when applying one or more transformations. For example, the edit propagation system performs one or more transformations such as scaling, translating, and rotating one or more segments in the vector graphic to determine which segments have an angle of rotation within a threshold angle relative to the initial segment.

As suggested above, in some cases, the edit propagation system refines the set of candidate segments to identify those segments of a vector graphic that are similar enough to the initial segment for propagating modifications. For example, the edit propagation system generates a refined set of candidate segments by identifying, from the set of candidate segments, those segments whose extensions are within a threshold similarity of extended versions of the initial segment. To elaborate, in some cases, the edit propagation system extends the initial segment in a first direction so that the expanded or extended version of the initial segment includes an additional anchor point along the first direction of a Bezier spline. In these or other cases, the edit propagation system further compares the extended version of the initial segment to extended versions of candidate segments which are extended to include the next adjacent anchor point when extended in the same direction as the initial segment.

In some embodiments, the edit propagation system removes candidate segments whose extensions fail to satisfy a threshold similarity in relation to the extended initial segment (e.g., after transformations of scaling, translation, and/or rotation). Additionally, in some cases, the edit propagation system extends the initial segment and the remaining candidate segments in the other direction as well (to include adjacent or neighboring anchor points in the direction along the spline opposite the first direction) and further compares the extensions to remove candidate segments that fail to satisfy the similarity threshold. In some embodiments, the edit propagation system repeats the extending and comparing process (in either or both directions) for a number of iterations until a threshold number of candidate segments have been removed and/or until no candidate segments remain (in which case, the edit propagation system walks back or undoes the latest iteration to retain the final candidate segment(s) which were removed in the final step).

As mentioned above, in some cases, the edit propagation system contemporaneously propagates modifications made to the initial segment across the refined set of candidate segments. For example, the edit propagation system receives a modification from a client device and contemporaneously (e.g., concurrently or extemporaneously with user input) applies corresponding modification to segments within the refined set of candidate segments. The edit propagation system accomplishes this in real-time, keeping pace with the user interactions applying edits via the client device. In some embodiments, the modifications are propagated using one or more transformations such as scaling, normalization, and rotation. To elaborate, the edit propagation system mirrors or otherwise augments the transformations applied to the initial segment such that the transformations match the context of the refined set of candidate segments (e.g., to match the relationships between the candidate segments and the initial segment).

As suggested above, many conventional vector editing systems exhibit a number of shortcomings or disadvantages, particularly in flexibility and efficiency. For example, many conventional vector editing systems rigidly require exact, precise segment definitions to determine similar portions of a vector graphic (e.g., by comparing a precisely defined segment to candidate segments). In addition, even when existing systems identify a similar segment from a precisely defined stencil path, such systems are often limited in their editing or modification of the vector graphic. More precisely, existing systems often rely on large numbers of client device interactions for applying exact manipulations to each individual segment independently.

Due at least in part to their inflexible natures, many conventional vector editing systems are also inefficient. To elaborate, many conventional vector editing systems perform every edit to a segment individually, leading to an excessive number of required interactions with the client device. Not only do many prior systems inefficiently edit vector graphics, but many prior systems also inefficiently process certain vector transformations. For example, many conventional vector editing systems consume excessive amounts of computing resources to process transformations of vector segments (particularly rotational transformations) for each point (e.g., anchor point and/or control point) of a Bezier spline. As a result of their prohibitively costly transformation processing, many existing systems are too inefficient and slow to apply vector modifications to one portion of a vector graphic in real time (or near real time) with user input editing another portion of the vector graphic.

As suggested above, embodiments of the edit propagation system provide certain improvements or advantages over conventional vector editing systems. For example, embodiments of the edit propagation system have improved flexibility over other systems. Specifically, the edit propagation system flexibly determines similar or matching segments of a vector graphic without requiring exact path definitions. Thus, compared to prior systems that require precise positions and lengths of segment paths to identify similar segments, the edit propagation system adapts to more generalized, approximate user input selecting vector segments. For instance, the edit propagation system receives a selection or a hover near a segment of a vector graphic and determines similar segments to the selected/hovered segment without further path definition. The edit propagation system thus adapts more flexibly to generalized segment selections than prior systems are capable.

Due at least in part to its improved flexibility, the edit propagation system further improves efficiency, requiring fewer interactions for applying modifications and consuming fewer computing resources for segment transformations. For example, rather than requiring separate interactions for modifying each individual segment of a vector graphic, the edit propagation system receives a modification to a single segment and automatically (and contemporaneously) applies corresponding modifications to other (similar or matching) segments without additional interactions in relation to the other segments. Accordingly, by receiving modifications to one segment and automatically applying corresponding modifications to matching segments, the edit propagation system requires far fewer client device interactions for vector graphic editing compared to prior systems.

In addition, by using a single segment point to determine (rotational) similarity between segments, the edit propagation system performs more efficient similarity (or transformation) processing than prior systems. Indeed, the edit propagation system reduces the complexity of determining similar partial components of a vector graphic to $O(n)$ as compared to $O(n^2)$ in prior systems. Thus, while prior systems are too slow for real-time editing in this sense, the single-point rotation processing of the edit propagation system greatly increases the efficiency and speed of calculating transformations and segment similarity, facilitating real-time (or near real-time) vector graphic modifications as user interactions apply modifications to other parts of the graphic.

Additional detail regarding the edit propagation system will now be provided with reference to the figures. For example, FIG. 1 illustrates a schematic diagram of an example system environment 100 for implementing an edit propagation system 102 in accordance with one or more embodiments. An overview of the edit propagation system 102 is described in relation to FIG. 1. Thereafter, a more detailed description of the components and processes of the edit propagation system 102 is provided in relation to the subsequent figures.

As shown, the environment includes server device(s) 104, a client device(s) 108, and a network 112. Each of the components of the environment communicate via the network 112, and the network 112 is any suitable network over which computing devices communicate. Example networks are discussed in more detail below in relation to FIG. 10.

As mentioned, the environment includes a client device(s) 108. The client device(s) 108 is one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single instance of the client device(s) 108, in some embodiments, the environment includes multiple different client devices, each associated with a different user. The client device(s) 108 communicates with the server device(s) 104 and/or the content editing system 106 via network 112. For example, the client device(s) 108 provides information to the server device(s) 104, such as a vector graphic and/or an indication of an approximate selection of an initial segment in the vector graphic. In response, the client device(s) 108 receives information from the server device(s) 104 indicating a modified vector graphic depicting modifications automatically propagated to segments similar to the initial segment.

As shown in FIG. 1, the client device(s) 108 includes a client application 110. In particular, the client application 110 is a web application, a native application installed on the client device(s) 108 (e.g., a mobile application or a desktop application), or a cloud-based application where all or part of the functionality is performed by the server device(s) 104. The client application 110 presents or displays information to a user, including a vector graphic editing interface for modifying vector graphic segments.

Further, as illustrated in FIG. 1, the environment includes the server device(s) 104. The server device(s) 104 generates, tracks, stores, processes, receives, and transmits electronic data, such as vector graphics, segments, modifications to segments, transformation data, candidate segments similar to initially edited segments, and/or a refined set of candidate segments. For example, the server device(s) 104 receives data from the client device(s) 108 in the form of an indication selecting and editing a segment of a vector graphic. In response, the server device(s) 104 provides data to the client device(s) 108 for presenting, rendering, or displaying a modified vector graphic with edits applied to segments similar to the initially edited segment.

In some embodiments, the server device(s) 104 communicates with the client device(s) 108 to transmit and/or receive data via the network 112. In some embodiments, the server device(s) 104 comprises a distributed server where the server device(s) 104 includes a number of server devices distributed across the network 112 and located in different physical locations. The server device(s) 104 comprise a content server, an application server, a communication server, a web-hosting server, a multidimensional server, or a machine learning server.

As further shown in FIG. 1, the server device(s) 104 also includes the edit propagation system 102 as part of a content editing system 106. For example, in one or more implementations, the content editing system 106 stores, generates, modifies, edits, enhances, provides, distributes, and/or shares digital content, such as digital images, vector graphics, emails, or digital videos. For example, the content editing system 106 provides digital content for editing or other forms of digital processing. In some implementations, the content editing system 106 provides digital content to particular digital profiles associated with client devices (e.g., the client device(s) 108).

In one or more embodiments, the server device(s) 104 includes all, or a portion of, the edit propagation system 102. For example, the edit propagation system 102 operates on the server device(s) 104 to update a vector similarity algorithm 114. For example, the vector similarity algorithm 114 is a computational process used to refine a set of candidate segments by determining which candidate segments are within a pre-defined threshold similarity in relation to the initial segment. In some embodiments, the vector similarity algorithm 114 evaluates candidate segments by extending the candidate segments, extending the initial segment, and determining which extended candidate segments are within a pre-defined threshold in relation to the extended initial segment. In other embodiments, the client device(s) 108 includes all or part of the edit propagation system 102. For example, the client device(s) 108 generates, obtains (e.g., downloads), or uses one or more aspects of the edit propagation system 102, such as the vector similarity algorithm 114. Indeed, in some implementations, as illustrated in FIG. 1, the edit propagation system 102 is located in whole or in part of the client device(s) 108. For example, the edit propagation system 102 includes a web hosting application that allows the client device(s) 108 to interact with the server device(s) 104. To illustrate, in one or more implementations, the client device(s) 108 accesses a web page supported and/or hosted by the server device(s) 104.

Although FIG. 1 illustrates a particular arrangement of the environment, in some embodiments, the environment has a different arrangement of components and/or may have a different number or set of components altogether. For instance, as mentioned, the edit propagation system 102 is implemented by (e.g., located entirely or in part on) the client device(s) 108. In addition, in one or more embodiments, the client device(s) 108 communicates directly with the edit propagation system 102, bypassing the network 112.

Figure 2:
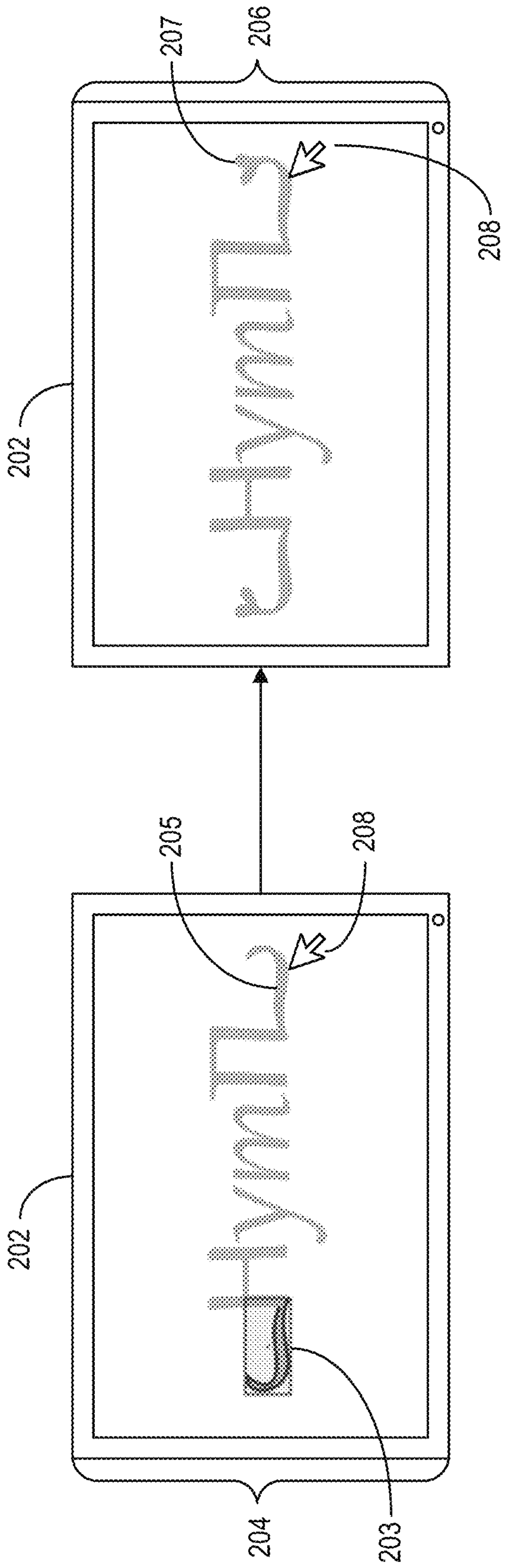
FIG. 2 illustrates an overview of generating a modified vector graphic by propagating modifications in accordance with one or more embodiments.

As mentioned, in one or more embodiments, the edit propagation system 102 generates a modified vector graphic by propagating modifications to segments that are similar to a segment edited via a client device. In particular, the edit propagation system 102 determines similar segments using various transformation and extension processes and applies edits to the similar segments in real time. FIG. 2 illustrates an overview of generating a modified vector graphic by propagating edits to similar segments in accordance with one or more embodiments. Additional detail regarding the various acts or components described in relation to FIG. 2 is provided thereafter with reference to subsequent figures.

As illustrated in FIG. 2, the edit propagation system 102 automatically propagates edits made to an initial segment 205 to a candidate segment 203, where a user adds the heart on the right and the edit propagation system 102 automatically generates the heart on the left contemporaneously as the heart edit on the right is made via user interaction. In some embodiments, a segment includes or refers to a portion of a vector graphic (e.g., a Bezier spline) between two anchor points. For example, an initial segment includes a segment that makes up a portion of an entire vector graphic, as delineated by anchor points on either end and with one or more control points defining the shape or curvature of the segment. In some embodiments, each anchor point in the segment is represented by three points (an in-handle, an anchor point, and an out-handle). Additionally, a candidate segment includes or refers to a segment within a vector graphic that falls within a pre-determined threshold similarity in relation to an initial segment with the vector graphic. Furthermore, in some embodiments, a vector graphic includes one or more of line art, geometric patterns, or other scalable digital artwork.

As part of the edit propagation process, the edit propagation system 102 receives an approximate selection of an initial segment 205 from a client device 202. In some embodiments, the edit propagation system 102 identifies the initial segment 205 based on an approximate user selection, as indicated by the cursor 208. For example, rather than requiring exact parameters defining the precise position or length of the initial segment 205 (as in some prior systems), the edit propagation system 102 utilizes an approximate input, such as a hover, click, or tap of a cursor over (or in the vicinity of or in relation to) the location of the initial segment 205. The edit propagation system 102 thus determines the initial segment 205 as the portion of the vector graphic 204 (as defined by a Bezier spline) between two anchor points closest to an input location. In some case, the edit propagation system 102 determines a distance from a pixel coordinate location of the input to the nearest anchor points of the vector graphic 204 and identifies the segment between the nearest anchor points.

As shown, the edit propagation system 102 generates and provides a modified vector graphic 206 upon applying heart-shaped edits to the vector graphic 204. Indeed, the edit propagation system 102 provides the modified vector graphic 206 for display on the client device 202. To ultimately apply the heart-shaped edit 207 to the candidate segment 203 (in real time with user interaction making the heart-shaped edit to the initial segment 205 via the client device 202), the edit propagation system 102 generates or determines a set of candidate segments. More specifically, the edit propagation system 102 determines candidate segments that are similar (in shape or appearance) to the initial segment 205 by comparing the initial segment 205 to one or more other segments in the vector graphic 204. For example, a segment is a portion of a Bezier curve delineated by two anchor points. For instance, the edit propagation system 102 generates a set of candidate segments by transforming segments in the vector graphic 204 to compare with the initial segment 205. Indeed, the edit propagation system 102 performs one or more transformations, such as translation, scaling, and/or rotation on one or more segments for comparing the transformed versions to the initial segment 205. In certain embodiments, the edit propagation system 102 transforms the initial segment 205 for comparison with other segments of the vector graphic 204.

Relating to the transformations, in some embodiments, the edit propagation system 102 performs a translation transformation. Specifically, the edit propagation system 102 translates one or more segments as part of comparing each respective segment to the initial segment 205. For example, the edit propagation system 102 translates a segment by calculating and moving a centroid of the segment (e.g., to the origin (0,0)). In some cases, the edit propagation system 102 determines and moves the centroid of the initial segment 205 to the origin in addition to, or instead of, each candidate segment.

As another type of transformation, in some embodiments, the edit propagation system 102 scales one or more segments for comparing with the initial segment 205. In some cases, the edit propagation system 102 scales a segment by normalizing the segment (e.g., so that each path has a root mean square distance of 1 from its points to the translated origin (0,0)). For example, to normalize a segment, the edit propagation system 102 adjusts the size of the segment without altering the proportions and relative shape of the segment. By scaling segments in this way, the edit propagation system 102 is able to more accurately compare segments to one another according to shape. In some cases, the edit propagation system 102 scales initial segment 205 in addition to or instead of each respective segment.

As a third type of transformation, in some cases, the edit propagation system 102 rotates one or more segments for comparing to the initial segment 205. For example, the edit propagation system 102 rotates a segment by fixing the segment at a pivot point, such as its centroid, and applying a transformation matrix to align the segment with an orientation of the initial segment 205. By rotating segments to align with the initial segment 205, the edit propagation system 102 is able to more accurately compare segments (e.g., with matching orientations). In some embodiments, the edit propagation system 102 fixes the initial segment 205 on the centroid of a segment and rotates the initial segment 205 to align with the segment for comparing the two segments.

In some cases, the edit propagation system 102 compares the transformed segments to the initial segment 205 to determine the set of candidate segments. For example, the edit propagation system 102 generates the set of candidate segments by determining which of the transformed segments fall within a threshold similarity in relation to the initial segment 205. In some embodiments, when performing comparisons, the edit propagation system 102 transforms the initial segment 205 in addition to or instead of the other segments in the vector graphic 204.

In some cases, the edit propagation system 102 generates or creates a refined set of candidate segments by pruning the set of candidate segments. For example, the edit propagation system 102 prunes a set of candidate segments by comparing extended versions of the initial segment 205 to extended versions of the candidate segments. To elaborate, the edit propagation system 102 extends the initial segment 205 in one direction such that the initial segment 205 contains an additional anchor point along the Bezier spline of the vector graphic 204 in the extension direction. Similarly, the edit propagation system 102 extends every candidate segment in the same direction that the initial segment 205 was extended. Thus, the edit propagation system 102 extends the candidate segment to a next adjacent or neighboring anchor point in the extension direction and compares the extended version of the candidate segment with the extended version of the initial segment 205. Based on the comparison, the edit propagation system 102 removes or prunes the candidate segment from the set of candidate segments if its extended version does not fall within a threshold similarity in relation to the extended version of the initial segment 205.

To compare extended candidate segments with an extended version of the initial segment 205, the edit propagation system 102 transforms the extended initial segment and/or each extended candidate segment to determine which extended candidate segments are within a threshold similarity relative to the extended initial segment. For example, the edit propagation system 102 performs transformations, including translations, scales, and rotations.

In some embodiments, the edit propagation system 102 performs multiple comparison iterations for pruning the set of candidate segments. To elaborate, the edit propagation system 102 performs multiple iterations to extend and compare candidate segments for pruning until a threshold percentage have been pruned and/or until no candidate segments remain. As part of this iterative process, the edit propagation system 102 builds extensions on one another through each iteration, growing a segment (e.g., the initial segment 205 and/or a candidate segment) anchor point by anchor point in a given extension direction and comparing each extension along the way.

In some cases, the edit propagation system 102 uses a cost function to determine that the set of candidate segments has been pruned enough to satisfy a pre-defined cost threshold. For example, the cost function determines if a pre-defined number or percentage of candidate segments have been pruned through the iterative process. In some embodiments, the edit propagation system 102 undoes the last (e.g., most recent) iteration performed upon determining that the cost function indicates that the cost threshold has been met or exceeded. For example, if the pre-defined percentage is 100%, the edit propagation system 102 will continue to extend and compare the initial segment 205 to similarly extended candidate segments until all the candidate segments have been pruned, and undo the final iteration, thus retaining at least one candidate segment.

In some embodiments, the edit propagation system 102 repeats the iterative pruning process in a second direction. More particularly, the edit propagation system 102 iteratively extends the initial segment 205 and candidate segments in an additional direction opposite the initial direction. In addition, the edit propagation system 102 compares the extended initial segment to extended candidate segments to prune candidate segments whose extensions fail to satisfy a similarity threshold in relation to the extended initial segment. The edit propagation system 102 further uses a cost function to indicate how far to take the pruning process.

In some embodiments, the edit propagation system 102 provides immediate visual feedback indicating the location of every segment in the refined set of candidate segments. For instance, as shown in FIG. 2, the edit propagation system 102 determines that candidate segment 203 remains within the refined set of candidate segments upon determining that the iterative pruning process is complete in both directions. Indeed, the edit propagation system 102 thus determines that the candidate segment 203 is within a threshold similarity relative to the initial segment 205 (based on multiple comparisons for non-extended and extended versions of each segment). Thus, the edit propagation system 102 generates a refined set of candidate segments that includes the candidate segment 203 as a segment to apply matching edits to those made to the initial segment 205.

Along these lines, as shown in FIG. 2, the edit propagation system 102 receives modifications made to the initial segment 205 from the client device 202 and propagates those modifications across a refined set of candidate segments in real-time. Indeed, the edit propagation system 102 modifies the initial segment 205 based on user interaction to apply a heart-shaped edit, and the edit propagation system 102 applies a corresponding modification to the candidate segment 203. In some embodiments, the edit propagation system 102 transforms the initial segment 205 (e.g., by translating, scaling, and/or rotating) and/or each segment in the refined set of segments to determine a relationship and/or how to propagate modifications onto the refined set of candidate segments (e.g., the candidate segment 203). In some embodiments, the edit propagation system 102 provides immediate visual feedback of the propagated modifications by, for example, highlighting the modified segment(s) or surrounding the modified segment(s) in dashed lines.

Figure 3:
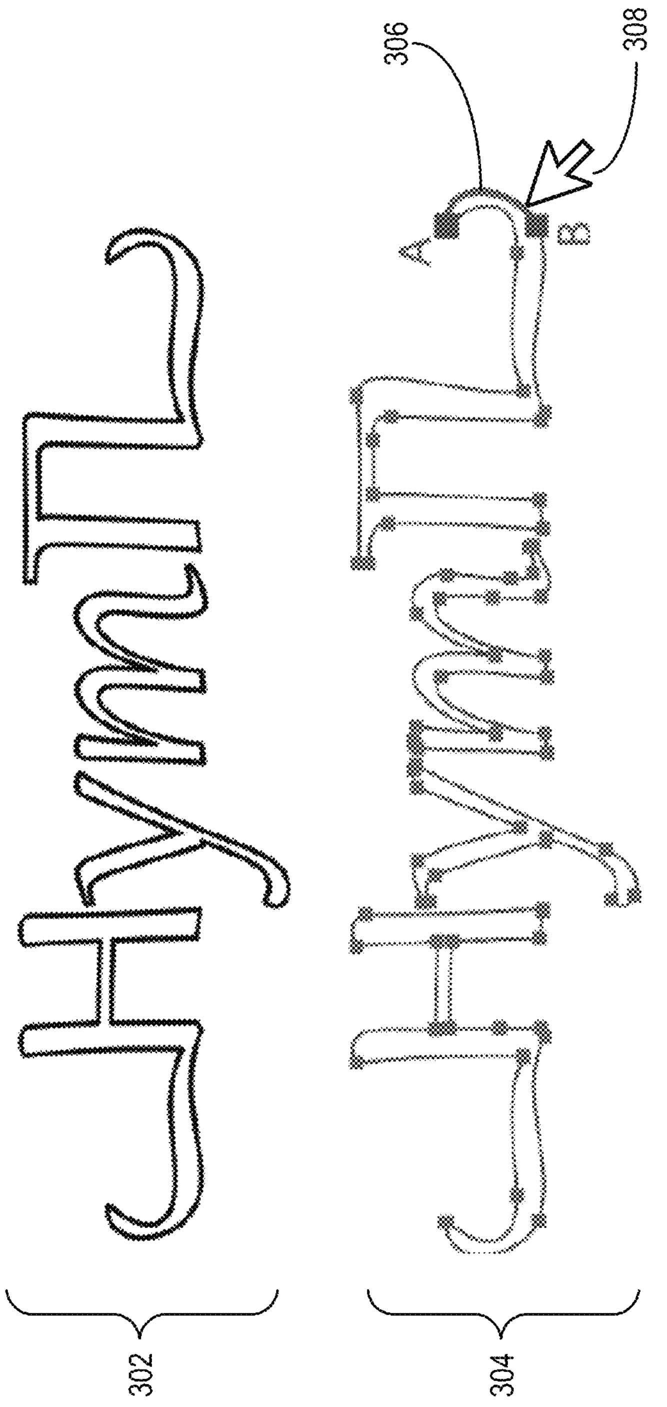
FIG. 3 illustrates an example of detecting an initial segment based on an approximate selection in accordance with one or more embodiments.

As mentioned above, the edit propagation system 102 performs a hit detection process to identify vector graphic segments selected or otherwise indicated by user interaction. In particular, the edit propagation system 102 determines a segment of a vector graphic nearest to a location of user input. FIG. 3 illustrates an example diagram of identifying an initial segment in a vector graphic in accordance with one or more embodiments.

As illustrated in FIG. 3, the edit propagation system 102 determines or detects a selection of an initial segment 306. More particularly, the edit propagation system 102 determines coordinate locations of a cursor based on a hover gesture, a selection, (or a touch input or some other interaction). In some cases, the edit propagation system 102 determines pixel coordinate locations of the cursor to compare with pixel coordinate locations of segments within the vector graphic. In certain embodiments, the edit propagation system 102 thus determines an approximate user selection of an initial segment 306.

In some embodiments, as part of determining the initial segment 306, the edit propagation system 102 captures the coordinates of the cursor 308. In addition, as illustrated in FIG. 3, the edit propagation system 102 determines the coordinates of every anchor point (and control point) in the vector graphic 302. In some cases, the edit propagation system 102 determines the distance from the nearest point of every segment (defined by its anchor points and/or control points) to the cursor coordinates of the cursor 308 and selects the nearest segment to the cursor 308 to serve as the initial segment 306. In some cases, the nearest point may be a control point, an anchor point, or any point along the curve of a segment as shown in the vector graphic 304.

In some embodiments, the edit propagation system 102 establishes a hit threshold, setting the maximum permissible distance between the cursor's coordinates and a segment to qualify as a "hit" or a potential initial segment.

In some cases, to facilitate accurate initial segment detection, the edit propagation system 102 performs additional checks, such as verifying if a segment is locked or hidden from editing (thus excluding the segment as a potential initial segment) and determining that a segment matches certain criteria set by the user or a computer application (e.g., layer, color, or stroke weight). For example, the edit propagation system 102 might only allow segments on a specific layer of a vector graphic, or segments with a particular color or stroke weight to be selected to verify that the selected segment matches an intended aesthetic or structural characteristic.

In some embodiments, the edit propagation system 102 provides immediate visual feedback to the user once the initial segment 306 is identified by, for example, highlighting the initial segment 306 or surrounding the initial segment 306 in dashed lines, indicating that the initial segment 306 is ready for editing (e.g., by bolding or otherwise visually distinguishing the initial segment 306 from other segments).

In some cases, the edit propagation system 102 uses the initial segment 306 as a key for editing the vector graphic 302. For example, the edit propagation system 102 uses the initial segment's anchor points and control points to identify and generate a set of candidate segments.

Figure 4:
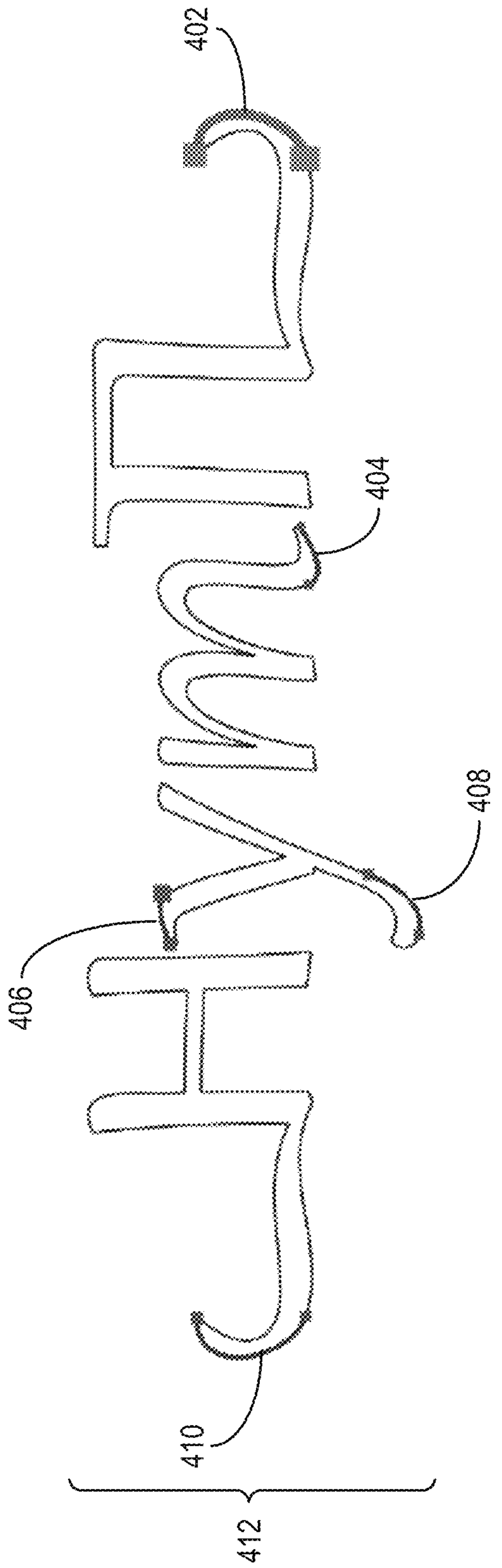
FIG. 4 illustrates an example of generating a set of candidate segments in accordance with one or more embodiments.

As just mentioned, the edit propagation system 102 generates a set of candidate segments from an initial segment. In particular, the edit propagation system 102 identifies segments within a vector graphic that are within a threshold similarity of the initial segment. FIG. 4 illustrates an example of generating a set of candidate segments in accordance with one or more embodiments.

As illustrated in FIG. 4, the edit propagation system 102 generates a set of candidate segments that includes a candidate segment 404, a candidate segment 406, a candidate segment 408, and a candidate segment 410. More specifically, the edit propagation system 102 compares segments of the vector graphic 412 with the initial segment 402 to identify candidate segments. In addition, the edit propagation system 102 stores candidate segments in a similar segment cache (e.g., in computer memory or in a database).

As part of this comparison, the edit propagation system 102 implements or applies one or more transformations such as translation, scaling, and rotation to one or more segments in the vector graphic 412. For example, the edit propagation system 102 compares a transformed version of every segment in the vector graphic 412 to the initial segment 402 to determine which segments are within a threshold similarity in relation to the initial segment 402 (and which therefore qualify as candidate segments). In some cases, the threshold similarity is a pre-determined Procrustes distance. To elaborate, the edit propagation system 102 performs one or more transformations such as translation, scaling, and/or rotation to orient two segments and determines the Procrustes distance between one or more points of the segments. In certain embodiments, the edit propagation system 102 determines if each segment in the vector graphic 412 is a candidate segment by calculating if the Procrustes distance between one or more points of each segment is within a predetermined Procrustes distance in relation to one or more points of the initial segment 402. In some embodiments, the edit propagation system 102 transforms the initial segment in addition to or in place of the remaining segments in the vector graphic 412.

As mentioned above, in some embodiments, the edit propagation system 102 performs a translation transformation on a segment (e.g., the candidate segment 404, the candidate segment 406, the candidate segment 408, and/or the candidate segment 410) for comparing with the initial segment 402. By translating a segment, the edit propagation system 102 standardizes the position of the segment. To elaborate, the edit propagation system 102 removes the variability of location between segments and allows for a direct comparison of shapes and sizes, independent of where each segment was originally located. For example, when the centroid of each segment is at the origin, mathematical operations such as scaling, rotation, and modification become more straightforward and computationally efficient because each transformation can be performed with respect to a consistent point.

As mentioned above, in some cases, the edit propagation system 102 translates a segment by locating and moving the centroid to the origin (0,0). For example, the centroid of a segment is a single point that represents the average position of all the points in the segment (e.g., the geometric center). In some embodiments, to facilitate translating the centroid of the segment, the edit propagation system 102 computes the x and y coordinates of the centroid. To elaborate, in some cases, the edit propagation system 102 calculates the x-coordinate and y-coordinate of the centroid of a segment according to the following equations:

$$\overline{P}_{centroidX} = \frac{\sum_{i=0}^{3N-1} x_i}{3N}$$

and $$\overline{P}_{centroidY} = \frac{\sum_{i=0}^{3N-1} y_i}{3N}$$

where $\overline{P}_{centroidX}$ is the x-coordinate of the centroid of the segment and $\overline{P}_{centroidY}$ is the y-coordinate of the centroid of the segment. To elaborate, the summation $$\sum_{i=0}^{3N-1} x_i$$

in the first equation represents the sum of all x-coordinates of the points in a segment, and $x_i$ represents the x-coordinate of the i-th point in the segment. Similarly, the summation $$\sum_{i=0}^{3N-1} y_i$$

in the second equation represents the sum of all y-coordinates of the points in the segment, and $y_i$ represents the y-coordinate of the i-th point in the segment. Because each anchor point in the segment is represented by three points (an in-handle, the anchor point itself, and an out-handle), in both equations, the edit propagation system 102 sums from i=0 to i=3N−1, where N is the total number of anchor points. Furthermore, the edit propagation system 102 sums the x-coordinates of the segment and divides by 3N, the total number of points considered. Thus, the edit propagation system 102 calculates the average x-coordinate, which gives the x-coordinate of the centroid. For the same reason, the edit propagation system 102 sums the y-coordinates of the segment and divides by 3N, which gives the y-coordinate of the centroid.

In some cases, when calculating the x and y coordinates of a centroid of a segment (e.g., the candidate segment 404, the candidate segment 406, the candidate segment 408, and/or the candidate segment 410), the edit propagation system 102 translates each point in the segment by subtracting the centroid's x-coordinate from the x-coordinate of each point and the centroid's y-coordinate from the y-coordinate of each point. To elaborate, the edit propagation system 102 performs the following translation process:

$$(x_i, y_i) \rightarrow \left(x_i - \overline{P}_{centroidX}, y_i - \overline{P}_{centroidY}\right)$$

giving the points $$\left(x_0 - \overline{P}_{centroidX}, y_0 - \overline{P}_{centroidY}\right)$$

where each point $(x_i, y_i)$ is moved by subtracting the centroid coordinates $\overline{P}_{centroidX}$ and $\overline{P}_{centroidY}$ from their respective x and y coordinates. The edit propagation system 102 thus effectively repositions the entire segment so that the centroid is at the origin (0,0), such that the means of the points in the segment is translated to the origin. The edit propagation system 102 has therefore prepared the segment to be scaled, rotated, and compared to the initial segment 402.

As mentioned above, in some embodiments, the edit propagation system 102 performs a scaling transformation. For example, the edit propagation system 102 scales each segment prior to comparison with the initial segment 402 to facilitate consistency in comparison. In some cases, by scaling a segment, the edit propagation system 102 performs meaningful comparisons by bringing segments to a common scale, thus simplifying geometric algorithms used in the comparison process. In some embodiments, the edit propagation system 102 scales the initial segment 402 either in addition to or instead of the segment(s) it is being compared to.

In some embodiments, the edit propagation system 102 scales a segment by normalizing the segment such that the segment's anchor points are evenly distanced from the origin. For example, the edit propagation system 102 adjusts the segment such that the average distance (e.g., root mean square distance) of its points from the origin is 1. To elaborate, the root mean square (RMS) distance for a set of points from the origin provides a measure of the "average" distance of those points from the origin.

In some embodiments, the edit propagation system 102 determines a scaling factor to apply to a segment according to the following formula:

$$s = \sqrt{\frac{\sum_{i=0}^{3N-1}\left(\left(x_i - \overline{P}_{centroidX}\right)^2 + \left(y_i - \overline{P}_{centroidY}\right)^2\right)}{3N}}$$

where s is the scaling factor used to normalize the path. To elaborate, the scaling factor represents the current size of the object in relation to the segment when normalized by the edit propagation system 102. For example, if s is 2, the given segment is twice the size of the normalized segment. The edit propagation system 102 determines the scaling factor by taking the square root of the average squared Euclidean distance from each point in the segment to the centroid, ensuring the path's average distance to the origin is unity.

More specifically, the edit propagation system 102 determines the average squared Euclidean distance by subtracting the x-coordinate of the centroid after being translated (represented mathematically as P centroidX) from the x-coordinate of the i-th point of the segment (represented mathematically as $x_i$) after being translated and squaring the result. Similarly, the edit propagation system 102 subtracts the y-coordinate of the centroid after being translated (represented mathematically as P centroidY from the y-coordinate of the i-th point of the segment (represented mathematically as $y_i$) after being translated and squares the result. The edit propagation system 102 further sums the squared difference between the x-coordinate of the centroid and the x-coordinate of the i-th point with the squared difference between the y-coordinate of the centroid with the y-coordinate of the i-th point. The edit propagation system 102 iteratively repeats this process for all points in the segment (from the initial point mathematically represented as i=0 to the final point mathematically represented as (3N−1)) until the summation includes all squared distances across the entire segment. Additionally, the edit propagation system 102 determines the average squared Euclidean distance from each point in the segment to the centroid of the segment by dividing the summation by the total number of points in the segment (mathematically represented as 3N).

In addition, the edit propagation system 102 determines the scale factor by taking the square root of the average squared Euclidean distance. In some embodiments, the edit propagation system 102 normalizes the segment by applying the scaling factor to the segment (e.g., the candidate segment 404, the candidate segment 406, the candidate segment 408, and/or the candidate segment 410), such that the segment is ready to be rotated and compared to the initial segment 205.

As indicated, the edit propagation system 102 performs a rotation transformation in addition (or alternatively) to translation and/or scaling. For example, the edit propagation system 102 uses Procrustes analysis to determine the rotational angle between two segments that results in the most precise alignment. For example, the edit propagation system 102 calculates a rotational angle between the coordinates of the initial segment 402 (mathematically represented as ($x_i$, $y_i$)) and the coordinates of another segment, such as the candidate segment 404 (mathematically represented as ($w_i$, $z_i$)), as given by the following equation:

$$\theta = \tan^{-1}\left(\frac{\sum_{i=0}^{3N-1}(w_i y_i - z_i x_i)}{\sum_{i=0}^{3N-1}(w_i y_i + z_i x_i)}\right)$$

where θ represents the rotation angle between the two segments such that, when applied to one path, minimizes (or reduces) the sum of squared distances between corresponding points between two segments.

$$\sum_{i=0}^{3N-1}.$$

represents the range of each summation. More specifically, the edit propagation system 102 starts each summation at 0 and ends at 3N−1 where N is the number of anchor points on each path. In some embodiments, the edit propagation system 102 identifies pairs of corresponding points between the two segments. In some cases, the edit propagation system 102 treats the vectors to these points as sides of a parallelogram. The edit propagation system 102 uses the summation $$\sum_{i=0}^{3N-1}(w_i y_i - z_i x_i)$$

to effectively compute the area of parallelograms formed by the vectors from the origin to the points ($w_i$,$y_i$) and ($z_i$,$x_i$). For example, the term $w_i y_i$-$z_i x_i$ gives the signed area of that particular parallelogram. The edit propagation system 102 uses the summation $$\sum_{i=0}^{3N-1}(w_i y_i + z_i x_i)$$

to relate the dot product of the vectors to corresponding points between the segments. For example, the edit propagation system 102 uses this summation to measure how much each vector in the initial segment 205 extends in the direction of the corresponding vector in another segment. The edit propagation system 102 uses the ratio of these two summations to identify the overall geometric relationship between two segments. For example, the edit propagation system 102 calculates the ratio of the summation of areas to the summation of dot products to yield a value that is the tangent to the most precise rotation angle. The edit propagation system 102 uses the inverse tangent function (mathematically represented as $\theta=\tan^{-1}$) to calculate the actual angle $\theta$ from the tangent value obtained from the ratio.

As previously mentioned, in some embodiments, the edit propagation system 102 reduces the computational expense of determining the rotational angle between two segments. Specifically, rather than determining rotations for each point (e.g., anchor point and/or control point) of the segments, the edit propagation system 102 simplifies the process to a single-point rotation, thus reducing the complexity from $O(n^2)$ to $O(n)$. For example, the edit propagation system 102 uses the following simplified rotational equation to determine the rotational angle between two segments by only comparing a single pair of corresponding points between two segments:

$$\theta = \tan^{-1}\left(\frac{(w_0 y_0 - z_0 x_0)}{(w_0 y_0 + z_0 x_0)}\right)$$

where $\theta$ represents the angle of rotation between the two segments. Here, the edit propagation system 102 determines $\theta$ by calculating the tangent inverse function (mathematically represented as $\tan^{-1}$) of the ratio between the signed area of the parallelogram formed by the first segment ($w_0 z_0$) and the corresponding point on the reference path ($x_0 y_0$), and the dot product of the two vectors represented by the corresponding points. For example, the edit propagation system 102 determines that if the segments are not within a threshold similarity, the calculated $\theta$ will result in a large Procrustes distance (e.g., where larger Procrustes distances indicate higher dissimilarity or lower similarity). The edit propagation system 102 will determine that a segment is a candidate segment by determining whether the rotational angle results in a Procrustes distance that is within a predefined range (or satisfies a threshold). By limiting the computation to a single point, the edit propagation system 102 gains efficiency and speed by reducing the need for serial processing. The edit propagation system 102 thus provides quicker identification of candidate similar segments and facilitates faster edit propagation across a vector graphic.

As illustrated in FIG. 4, the edit propagation system 102 performs transformations such as translation, scaling, and rotation to determine a set of candidate segments, which includes the candidate segment 404, the candidate segment 406, the candidate segment 408, and the candidate segment 410. As shown, some candidate segments do not visually resemble the initial segment 402 despite passing the similarity comparisons of the described transformations. Accordingly, the edit propagation system 102 further prunes the set of candidate segments to remove or exclude candidate segments that do not visually resemble the initial segment 402.

As mentioned above, in some embodiments, the edit propagation system 102 applies a transformation matrix on a segment to align the segment to the initial segment 402 for comparison. By aligning the two segments, the edit propagation system 102 considers the geometric similarity of the segments despite their different orientations. Thus, in some embodiments, the edit propagation system 102 assesses similarity between segments based on shape and structure rather than position or orientation.

To elaborate, in some cases, the edit propagation system 102 uses the following transformation matrix to compute similarity between segments:

$$P = \begin{bmatrix} p_{in0x} & p_{in0y} \\ p_{0x} & p_{0y} \\ p_{out0x} & p_{out0y} \\ \vdots & \vdots \\ p_{in(N-1)x} & p_{in(N-1)y} \\ p_{(N-1)x} & p_{(N-1)y} \\ p_{out(N-1)x} & p_{out(N-1)y} \end{bmatrix} \quad \begin{matrix} x_i & y_i \end{matrix}$$

where the transformation matrix P is structured such that each row corresponds to a specific point or handle associated with an anchor point of a segment. Using the transformation matrix, the edit propagation system 102 analyzes N anchor points. To elaborate, the first column, denoted by $x_i$, contains the x-coordinates of each anchor point, while the second column, denoted by $y_i$, contains the y-coordinates. The subscripts $p_{in}$, p, and $p_{out}$ refer to the incoming handle, anchor point, and outgoing handle of each segment, respectively. For example, $p_{in0x}$ and $p_{in0y}$ represent the x and y coordinates of the incoming handle of the first anchor point, while $p_{0x}$ and $p_{0y}$ represent the coordinates of the first anchor point itself. This pattern continues for all N anchor points, with $p_{out(N-1)x}$ and $P_{out(N-1)y}$ representing the outgoing handle coordinates of the last anchor point. The edit propagation system 102 thus uses this transformation matrix to represent each segment in a way that can be efficiently manipulated and compared. In one or more embodiments, the edit propagation system 102 utilizes a technique for determining similarity as described by Sumit Dhingra et al. in U.S. Pat. No. 11,055,810, titled OPTIMIZING GRAPHICS GEOMETRY USING SIMILARITY-BASED CLUSTERING, filed Mar. 30, 2020, which is hereby incorporated by reference in its entirety.

Figure 5A:
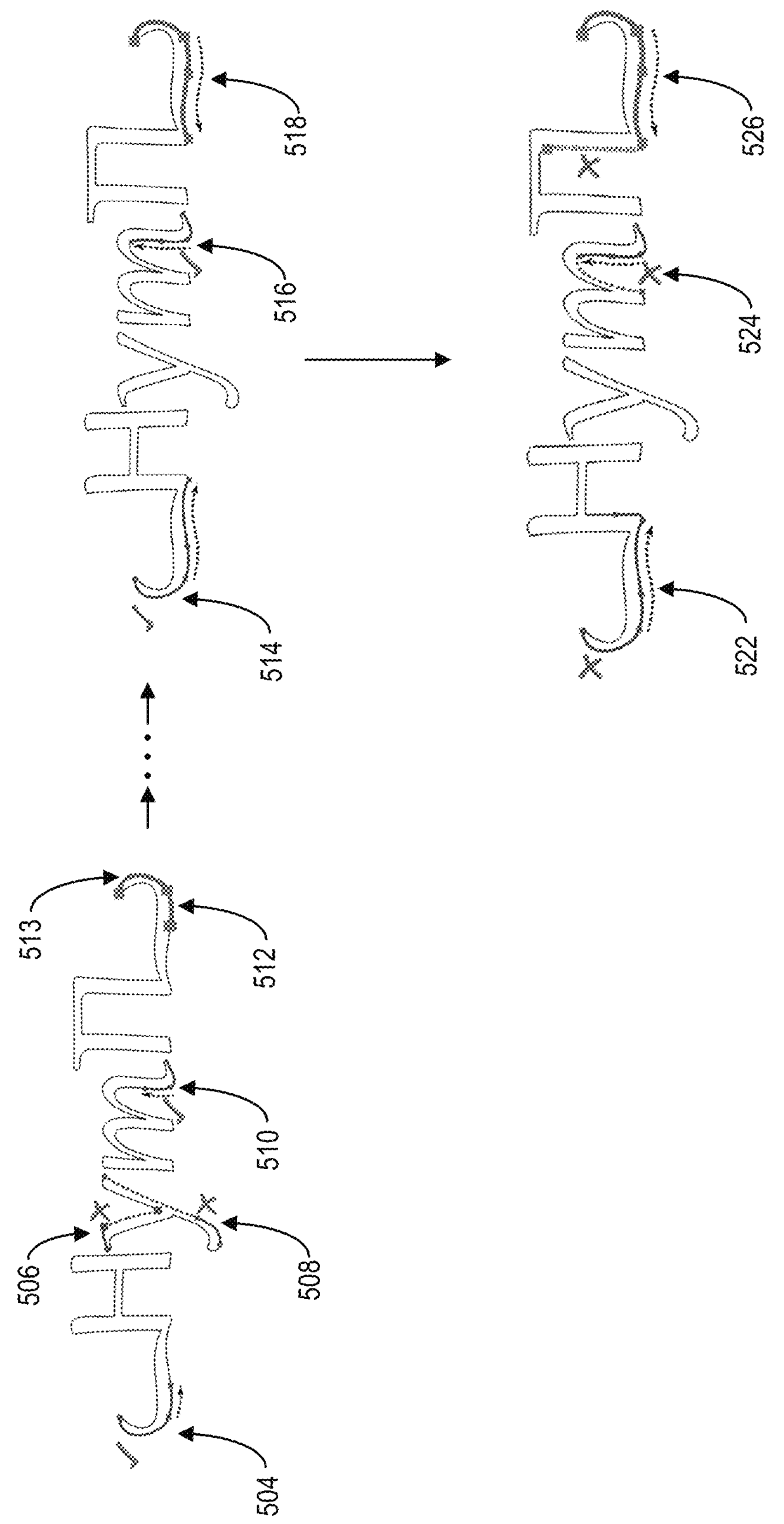
FIGS. 5A-5B illustrate an example of generating a refined set of candidate segments in accordance with one or more embodiments.
Figure 5B:
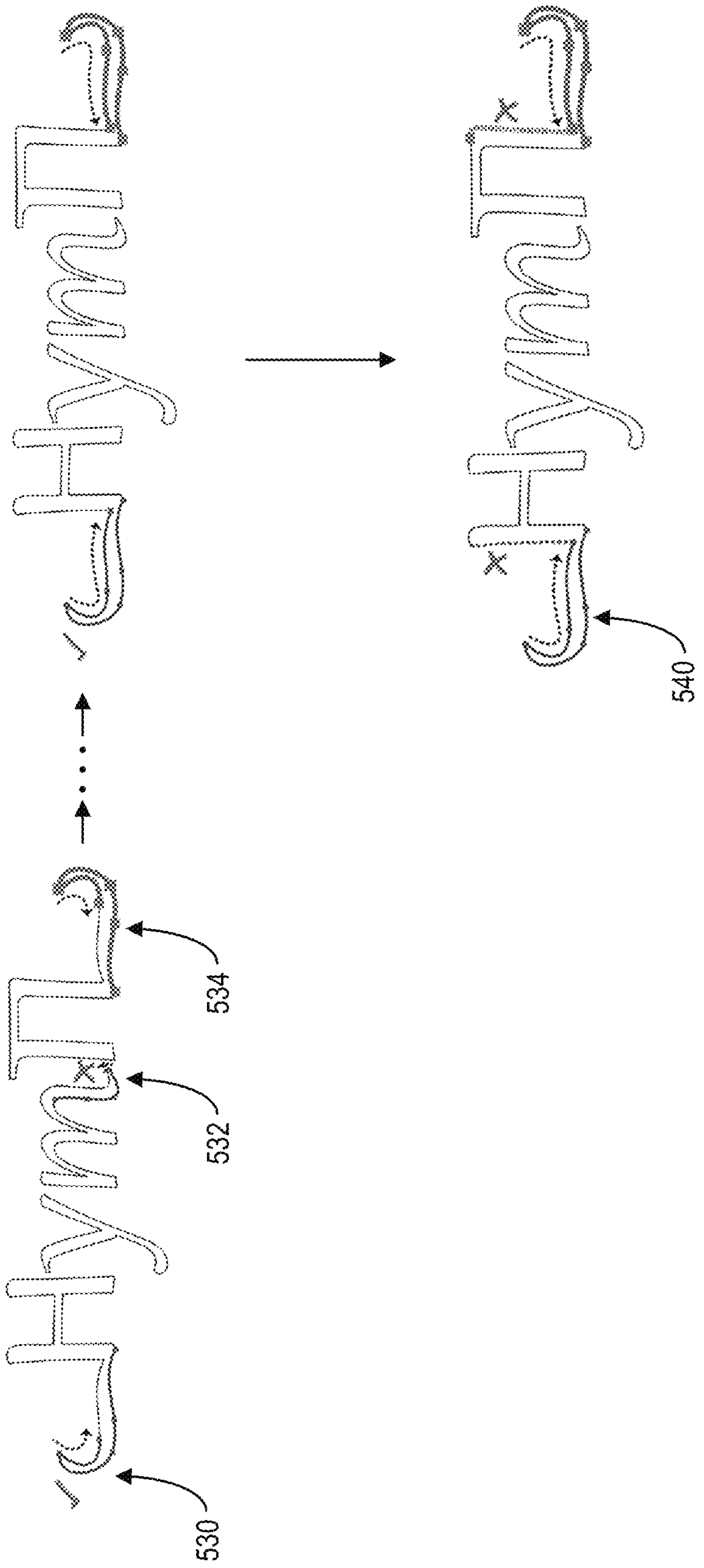

As mentioned, in some embodiments, the edit propagation system 102 prunes candidate segments that do not resemble an initial segment. In particular, the edit propagation system 102 generates a refined set of candidate segments that excludes candidate segments whose extensions do not satisfy a threshold similarity in relation to extended versions of an initial segment. FIGS. 5A-5B illustrate an example diagram for extending and comparing candidate segments to generate a refined set of candidate segments in accordance with one or more embodiments. For example, FIG. 5A illustrates an example diagram for a first part of generating a refined set of candidate segments by extending candidate segments in a first direction. Thereafter, FIG. 5B illustrates an example diagram for a second part of generating a refined set of candidate segments by extending the candidate segments in a second direction.

As illustrated in FIG. 5A, the edit propagation system 102 generates a refined set of candidate segments by iteratively pruning segments from a set of candidate segments. For example, the edit propagation system 102 implements various steps or processes to iteratively extend, transform, and compare an initial segment and candidate segments to generate a refined set of candidate segments. For instance, the edit propagation system 102 utilizes a vector similarity algorithm (e.g., the vector similarity algorithm 114) defined by the following pseudo code:

```
procedure EXTENDRIGHT(b_i, Σ_i) ▷ b_i is stencil and Σ_i is pruned cache at i_th stage
   increase segment length by including segment i + 1_th segment.
   b_{i+1} ← appending (i + 1) segment on b_i
   Σ_{i+1} ←
   for every candidate segment t_i in Σ_i do
      t_{i+1} ← appending (i + 1) segment on t_i
      δ ← transformation matrix of t
      Use δ and equation 3 to compute similarity on last segment.
      if similarity error is within threshold then
         add t_{i+1} in Σ_{i+1}
   return (b_{i+1}, Σ_{i+1} )
  Σ_0 ← initial similar candidates.
  every t_i in Σ_0 will have a matrix computed using the single-point rotational equation
  cost ← 0
   while cost ≤ threshold do
   b_{i+1}, Σ_{i+1} ← EXTENDRIGHT(b_i, Σ_i )
   cost ← compute cost using Σ_{i+1} and Σ_i
  use b_i, Σ_i
  similar extension is done from left. return range from (i_l, i_r) ▷ left index to right index
 of
base path segment
```

where the initial segment is mathematically represented as $b_i$ and the set of candidate segments is mathematically represented as $\Sigma_i$. $\Sigma_0$ represents the initial set of candidate segments, $t_i$ represents each candidate in the set of candidate segments, and $b_{i+1}$ represents the edit propagation system 102 extending the initial segment to the nearest anchor point in one direction. Additionally, $\Sigma_{i+1}$, represents the edit propagation system 102 extending each candidate segment in the same direction as the initial segment, $\delta$ represents transformations such as translation, scaling, and rotation, $i_{th}$ represents the iteration that the edit propagation system 102 is currently performing, and $li_l$, $i_r$ represents a range of indices within the path segment of the vector graphic.

As indicated by the pseudo code above, and as illustrated in FIG. 5A, the edit propagation system 102 extends the initial segment 513 in a first direction (in this case left) to include a next adjacent anchor point in the extension direction. The edit propagation system 102 further transforms the extended initial segment 512 to facilitate comparisons with extended candidate segments. Indeed, the edit propagation system 102 extends each candidate segment in the same direction as the extended initial segment 512. For example, the edit propagation system 102 generates an extended version of the candidate segment 504, the extended version of the candidate segment 506, the extended version of the candidate segment 508, and the extended version of the candidate segment 510 by extending in the same direction as the extended initial segment 512. To elaborate, the edit propagation system 102 determines what direction to extend each candidate segment by performing one or more transformations such as translation, scaling, and rotation to align each candidate segment with the initial segment 513. The edit propagation system 102 thus verifies that the candidate segments are extended in a direction that allows for accurate and consistent comparison, regardless of their initial orientation within a vector graphic. For example, the edit propagation system 102 mirrors or reflects the extension applied to the initial segment 513 unto the candidate segment 504, making it appear to be extended opposite the direction that the initial segment 513 is extended.

In some cases, the edit propagation system 102 also transforms each extended candidate segment to align with the extended initial segment 512. In some cases, the edit propagation system 102 transforms each extended candidate segment by translating, scaling, and rotating each extended candidate segment to align with the extended initial segment 512. To elaborate, in some cases, the edit propagation system 102 applies the transformations described above.

Additionally, the edit propagation system 102 compares the extended candidate segments to the extended initial segment 512 and removes any segment from the set of candidate segments if the extended version of the candidate segment is not within a threshold similarity in relation to the extended initial segment 512. As shown, the edit propagation system 102 prunes or removes candidate segment 506 and candidate segment 508 in FIG. 5A because their extensions do not fall within the threshold similarity in relation to the extended initial segment 512. Thus, the edit propagation system 102 extends, transforms, and compares every candidate segment to the extended initial segment 512 and removes any candidate segment that, when extended, is not within a threshold similarity in relation to the extended initial segment 512.

In some embodiments, the edit propagation system 102 repeats the extension and comparison process for multiple iterations. As shown, the extended candidate segment extends the extended initial segment 512 a second time in the same direction (e.g., to a next adjacent anchor point). For example, as illustrated in FIG. 5A, the edit propagation system 102 extends the extended initial segment 512 to generate the extended initial segment 518 as a twice-extended version of the initial segment.

The edit propagation system 102 likewise extends each remaining (unpruned) candidate segment in the set of candidate segments a second time in the same direction as the extended initial segment 518. For example, as illustrated in FIG. 5A, the edit propagation system 102 extends candidate segment 504 and candidate segment 510 a second time in the left direction, resulting in twice-extended candidate segment 514 and twice-extended candidate segment 516, respectively. In some embodiments, the edit propagation system 102 further transforms the twice-extended candidate segment 514 and twice-extended candidate segment 516 (as described above) and removes any remaining candidate segments whose extensions are not within a threshold similarity in relation to the extended initial segment 518. For example, as illustrated in FIG. 5A, the edit propagation system 102 determines that the twice-extended candidate segment 514 and twice-extended candidate segment 516 were not within a threshold similarity in relation to the extended initial segment 518.

In some embodiments, the edit propagation system 102 continues iterating through this process of extending, transforming, and comparing the initial segment and the set of candidate segments until a cost function indicates that a pre-defined cost threshold has been satisfied. In some cases, the edit propagation system 102 utilizes the following cost function:

$$\text{cost} = \left(\frac{\sum_i}{\sum_{i+1}}\right)$$

where $\Sigma_i$ represents the number of initial candidate path segments from iteration i, and $\Sigma_{i+1}$ represents the number of candidate path segments from the next iteration i+1. To elaborate, the cost function is a ratio of the number of candidate segments between two consecutive iterations. For example, if this ratio increases significantly, the edit propagation system 102 determines that the number of candidate stencils in the i+1 iteration (denominator) has decreased significantly compared to the i-th iteration (numerator). The cost function thus determines that the inclusion of an extra path segment in the i+1 iteration causes a significant deviation from the initial number of candidate stencils. Thus, the edit propagation system 102 uses a cost function to determine when to stop refining the set of candidate segments by determining if a pre-defined cost threshold has been surpassed.

For example, in FIG. 5A, the edit propagation system 102 ceases refining the set of candidate segments after pruning every candidate segment (e.g., the threshold is set to 1 or 100%). In some cases, the edit propagation system 102 undoes the last iteration after every candidate segment has been pruned so that at least one candidate segment remains in the refined set of candidate segments. For example, as illustrated in FIG. 5A, the edit propagation system 102 removes candidate segments 522 and 524, thus pruning 100% of the candidate segments. In some embodiments, as illustrated in FIG. 5B, the edit propagation system 102 retracts this iteration, and therefore retains candidate segments 522 and 524. In some cases, the edit propagation system 102 ceases iterating when the cost function is satisfied (or all the candidate segments are pruned) so the extended initial segment 512 is only extended up to that point and no further (as indicated by thrice-extended candidate segment 526).

As illustrated in FIG. 5B, the edit propagation system 102 repeats similar steps in a different extension direction to further refine or prune the set of candidate segments. Indeed, FIG. 5B illustrates extending candidate segments (which have already been tested in the first extension direction) in a second extension direction to compare with an extended version of an initial segment (also extended in the second direction).

As illustrated in FIG. 5B, in some embodiments, when the cost function indicates that the edit propagation system 102 should no longer prune the set of candidate segments by extending and comparing in one direction, the edit propagation system 102 further prunes the set of candidate segments by extending and comparing in another direction. For example, the edit propagation system 102 further extends the extended initial segment 518 in a second direction (in this case right). Additionally, the edit propagation system 102 extends each remaining twice-extended candidate segment in the second direction. For example, FIG. 5B illustrates the edit propagation system 102 extending candidate segment 530 and candidate segment 532 to the right. Further, the edit propagation system 102 transforms each extended candidate segment and compares each extended candidate segment to the extended initial segment 534. The edit propagation system 102 iteratively repeats this process until the cost function again indicates that the cost threshold is satisfied.

For example, FIG. 5B illustrates that the edit propagation system 102 prunes or removes candidate segment 532 after the first iteration and prunes extended candidate segment 540 after a third iteration, whereupon the cost function determines that the cost function has been exceeded and ceases iterating. In some cases, the edit propagation system 102 undoes the last iteration and recovers the extended candidate segment 540 as the only remaining segment in the set of refined candidate segments. Thus, by extending and comparing in both directions, the edit propagation system 102 prunes the set of candidate segments to generate a refined set of candidate segments that is ready to be modified contemporaneously with the initial segment.

In some cases, the edit propagation system 102 generates a refined set of candidate segments by using the transformation matrix described above to compare segments. For example, once the edit propagation system 102 generates the transformation matrix, the edit propagation system 102 applies the matrix to appended segments of each candidate stencil and determines an error to compare with an error threshold (e.g., a similarity threshold). Indeed, in certain embodiments, the edit propagation system 102 transforms and compares appended portions of segments, such as the extension of a candidate segment and a corresponding extension of an initial segment using the transformation matrix (and the corresponding transformations) described herein. Thus, rather than re-comparing each segment (and/or every part of every segment), the edit propagation system 102 compares appended segments (e.g., only the extension portions added to candidate segments or, in some cases, the entire extended versions of the candidate segments), thus reducing complexity from $O(n^2)$ to $O(n)$ compared to some prior systems.

Figure 6:
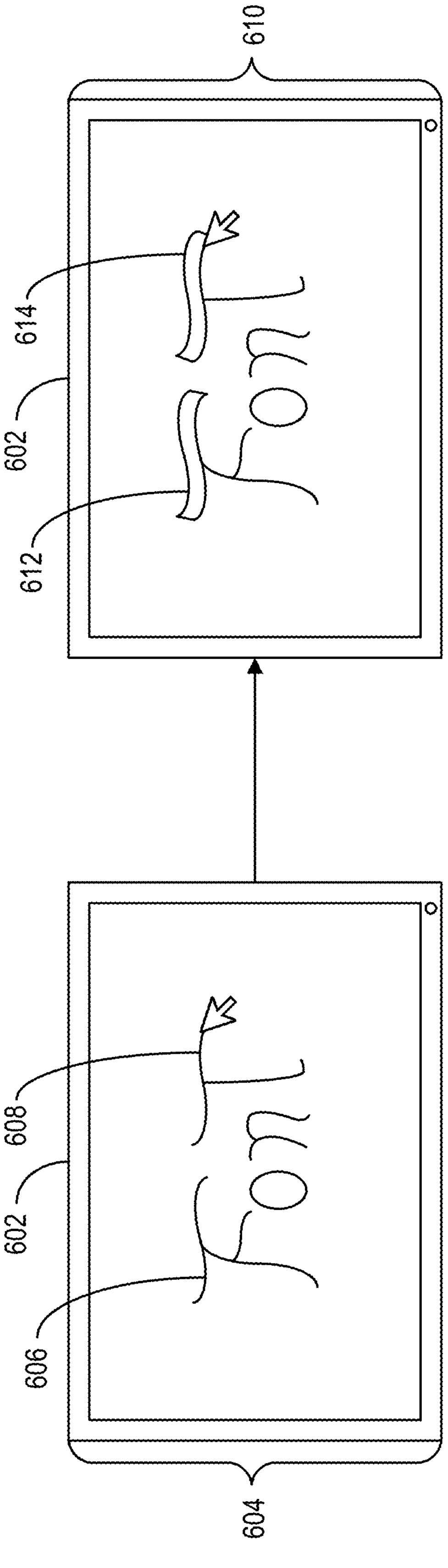
FIG. 6 illustrates an example of contemporaneously propagating modifications to generate a modified vector graphic in accordance with one or more embodiments.

As just mentioned, in certain embodiments, the edit propagation system 102 automatically applies edits to candidate segments to match edits made via a client device to an initial segment. In particular, the edit propagation system 102 applies edits to matching candidate segments contemporaneously in real time as edits are applied to the initial segment. FIG. 6 illustrates applying edits to candidate segments in accordance with one or more embodiments.

As illustrated in FIG. 6, in some embodiments, the edit propagation system 102 tracks or detects modifications made to an initial segment 608 via user interaction with the client device 602. For example, the edit propagation system 102 determines modifications made to the initial segment 608 to edit shape, position, scale, and/or rotation. In some embodiments, the edit propagation system 102 determines modifications to color, pattern, opacity, or other features of the initial segment 608. Indeed, the edit propagation system 102 generates a modified initial segment 614 from the initial segment 608 based on the user interaction via the client device 602.

In some cases, the edit propagation system 102 propagates the modifications from the modified initial segment

614 to a refined set of candidate segments. For example, the edit propagation system 102 performs the described processes to extend, transform, and compare candidate segments and/or the initial segment 608. Upon determining that the refined set of candidate segments includes a candidate segment 606, the edit propagation system 102 transforms the modifications made to initial segment 608 to apply to the candidate segment 606. In some embodiments, the edit propagation system 102 extemporaneously performs these steps to apply modifications made to the initial segment 608 across the refined set of candidate segments as the user is modifying the initial segment 608 on the client device 602.

For example, as illustrated in FIG. 6, the edit propagation system 102 propagates the modifications made to initial segment 608 on client device 602 onto the set of refined candidate segments that includes the candidate segment 606. To elaborate, the user selects the initial segment 608 in the vector graphic 604. The edit propagation system 102 generates a set of candidate segments and refines the set of candidate segments until candidate segment 606 is the only segment remaining in the refined set of candidate segments, as described above. Additionally, the edit propagation system 102 tracks the modifications made to the initial segment 608 to create the modified initial segment 614 and applies the modifications to the candidate segment 606 to generate the modified candidate segment 612. Thus, as shown in the vector graphic 610, the edit propagation system 102 applies the modifications made to the initial segment 608 and extemporaneously presents the modified candidate segment 612 on the client device 602.

Figure 7:
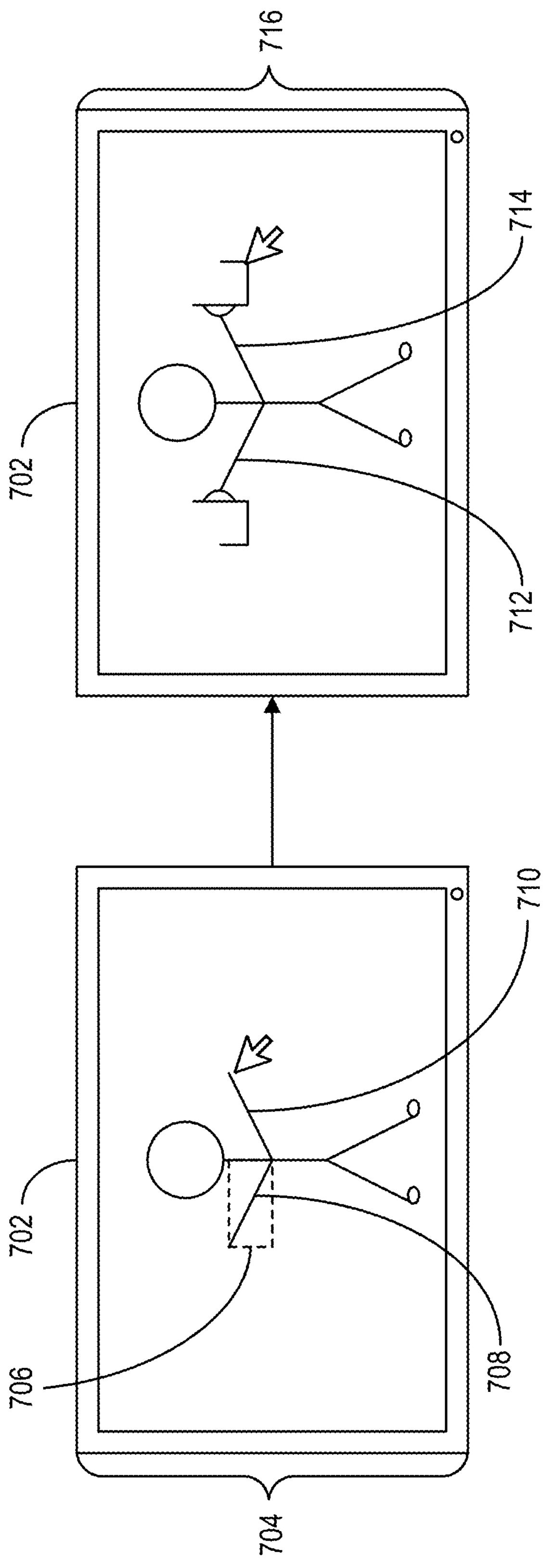
FIG. 7 illustrates an example of contemporaneously propagating modifications to generate a modified vector graphic in accordance with one or more embodiments.

As mentioned above, the edit propagation system 102 does not exclusively modify vector graphics for fonts or other typographical elements. Indeed, the edit propagation system 102 also modifies vector graphics of other varieties, such as illustrations, or other computer-generated vector images. FIG. 7 illustrates an example of propagating modifications for a non-text vector graphic in accordance with one or more embodiments.

As illustrated in FIG. 7, the edit propagation system 102 receives an approximate selection from a client device identifying an initial segment 710 within a vector graphic 704. The edit propagation system 102 further receives user interaction via the client device 702 to edit the initial segment 710 and contemporaneously propagates corresponding modifications from the initial segment 710 to a candidate segment 708 (within a refined set of candidate segments). As shown, the edit propagation system 102 also generates a visual indicator 706 of the location of the candidate segment 708.

In addition, the edit propagation system 102 receives modifications to the initial segment 710 to generate a shape on the end, thus generating the modified initial segment 714. As shown, the edit propagation system 102 generates the updated vector graphic 716 for display on the client device 702, including the modified initial segment 714 and a modified candidate segment 712 reflecting corresponding edits. Thus, the edit propagation system 102 seamlessly synchronizes changes made to an initial segment 710 onto the candidate segments 708 for consistency without applying the edit to other, non-similar segments in the vector graphic 704.

Figure 8:
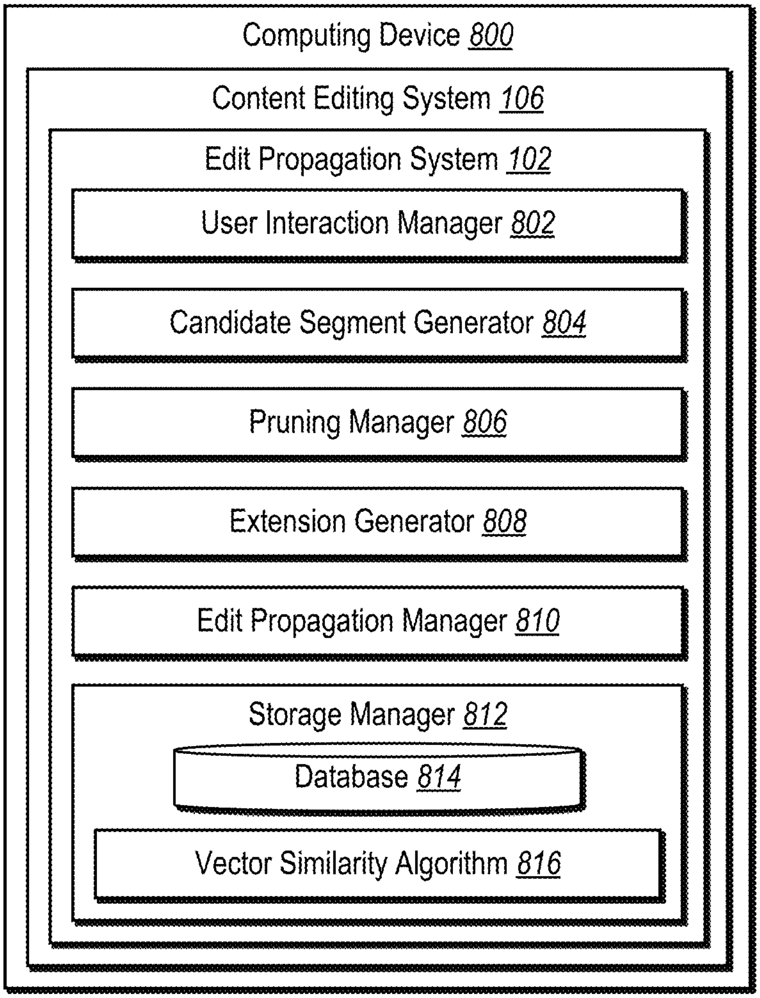
FIG. 8 illustrates a schematic diagram of an edit propagation system in accordance with one or more embodiments.

Looking now to FIG. 8, additional detail will be provided regarding components and capabilities of the edit propagation system 102. Specifically, FIG. 8 illustrates an example schematic diagram of the edit propagation system 102 on an example computing device 800 (e.g., one or more of the client device(s) 108 and/or the server device(s) 104. In some embodiments, the computing device 800 refers to a distributed computing system where different managers are located on different devices, as described above. As shown in FIG. 8, the edit propagation system 102 includes a user interaction manager 802, a candidate segment generator 804, a pruning manager 806, an extension generator 808, an edit propagation manager 810, and a storage manager 812.

As just mentioned, the edit propagation system 102 includes a user interaction manager 802. In particular, the user interaction manager 802 manages, maintains, receives, detects, identifies, or determines user interactions from a client device. For instance, the user interaction manager 802 receives an approximate selection of an initial segment within a vector graphic. In some cases, the user interaction manager 802 receives a vector graphic from a client device (e.g., via an upload) and identifies an initial segment by determining distances from an input location to points within segments of the vector graphic, as described herein.

As shown, the edit propagation system 102 also includes a candidate segment generator 804. In particular, the candidate segment generator 804 manages, maintains, stores, accesses, provides, determines, generates, predicts, or identifies a set of candidate segments within a vector graphic. For example, the candidate segment generator 804 performs one or more transformations such as translation, scaling, and rotation on segments of a vector graphic. In addition, the candidate segment generator 804 compares the transformed segments with an initial segment to determine which segments in a vector graphic fall within a threshold similarity in relation to the initial segment.

As further illustrated in FIG. 8, the edit propagation system 102 includes a pruning manager 806. In particular, the pruning manager 806 manages, maintains, stores, accesses, provides, determines, generates, predicts, or identifies a refined set of candidate segments (e.g., by pruning or removing candidate segments from a set of candidate segments). For example, the pruning manager 806 performs one or more extensions on an initial segment and candidate segments to determine or identify extended candidate segments that are within a threshold similarity in relation to an extended version of the initial segment. In some embodiments, the pruning manager 806 removes one or more candidate segments from a set of candidate segments based on a determination that extensions of one or more candidate segments are not within a threshold similarity in relation to an extended version of the initial segment.

Additionally, the edit propagation system 102 includes an extension generator 808. In particular, the extension generator 808 manages, maintains, updates, determines, modifies, tunes, adjusts, generates, or recalibrates extensions on one or more segments in a vector graphic. For example, the extension generator 808 extends a user-selected segment received by the user interaction manager 802 and one or more candidate segments generated by the candidate segment generator 804 to enable the pruning manager 806 to refine the set of candidate segments. In some cases, the extension generator 808 performs an iterative extension process in multiple directions, as described herein.

As shown, the edit propagation system 102 also includes an edit propagation manager 810. In particular, the edit propagation manager 810 manages, maintains, propagates, updates, determines, modifies, edits, adjusts, generates, applies, or recalibrates one or more modifications made to one or more segments across a set of similar segments in a vector graphic. For example, the edit propagation manager 810 identifies modifications made to an initial segment in a vector graphic and propagates the modifications to each segment in a refined set of candidate segments (e.g., in real time with user edits to the initial segment). In some embodiments, the edit propagation manager provides visual representations of propagated modifications to the user.

The edit propagation system 102 further includes a storage manager 812. The storage manager 812 operates in conjunction with or includes one or more memory devices such as the database 814 that store various data such as vector graphics, selections of segments, sets of candidate segments, refined sets of candidate segments, and modifications to segments. The storage manager 812 further includes a vector similarity algorithm 816 that, when executed using the candidate segment generator 804 and/or the pruning manager 806, compares segments to determine similarity scores (or other similarity measures) between them.

In one or more embodiments, each of the components of the edit propagation system 102 are in communication with one another using any suitable communication technologies. Additionally, the components of the edit propagation system 102 are in communication with one or more other devices including one or more client devices described above. It will be recognized that although the components of the edit propagation system 102 are shown to be separate in FIG. 8, any of the subcomponents may be combined into fewer components, such as into a single component, or divided into more components as may serve a particular implementation. Furthermore, although the components of FIG. 8 are described in connection with the edit propagation system 102, at least some of the components for performing operations in conjunction with the edit propagation system 102 described herein may be implemented on other devices within the environment.

The components of the edit propagation system 102, in one or more implementations, includes software, hardware, or both. For example, the components of the edit propagation system 102 include one or more instructions stored on a computer-readable storage medium and executable by processors of one or more computing devices (e.g., the computing device 800). When executed by the one or more processors, the computer-executable instructions of the edit propagation system 102 cause the computing device 800 to perform the methods described herein. Alternatively, the components of the edit propagation system 102 comprises hardware, such as a special purpose processing device to perform a certain function or group of functions. Additionally, or alternatively, the components of the edit propagation system 102 includes a combination of computer-executable instructions and hardware.

Furthermore, the components of the edit propagation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the edit propagation system 102 may be implemented as part of a stand-alone application on a personal computing device or a mobile device. Alternatively, or additionally, the components of the edit propagation system 102 may be implemented in any application that allows creation and delivery of marketing content to users, including, but not limited to, applications in ADOBE® EXPERIENCE MANAGER and CREATIVE CLOUD®, such as ADOBE® STOCK, ADOBE® FONTS, ADOBE® LIGHTROOM, PHOTOSHOP®, ILLUSTRATOR®, and INDESIGN®. "ADOBE," "ADOBE EXPERIENCE MANAGER," "CREATIVE CLOUD," "ADOBE STOCK," "ADOBE FONTS," "ADOBE LIGHTROOM" "PHOTOSHOP," "ILLUSTRATOR," and "INDESIGN" are either registered trademarks or trademarks of Adobe Inc. in the United States and/or other countries.

FIGS. 1-8, the corresponding text, and the examples provide a number of different systems, methods, and non-transitory computer readable media for contemporaneously propagating modifications made to a user-selected segment in a vector graphic to similar segments within the vector graphic. In addition to the foregoing, embodiments are describable in terms of flowcharts comprising acts for accomplishing a particular result. For example, FIG. 9 illustrates flowcharts of example sequences or series of acts in accordance with one or more embodiments.

Figure 9:
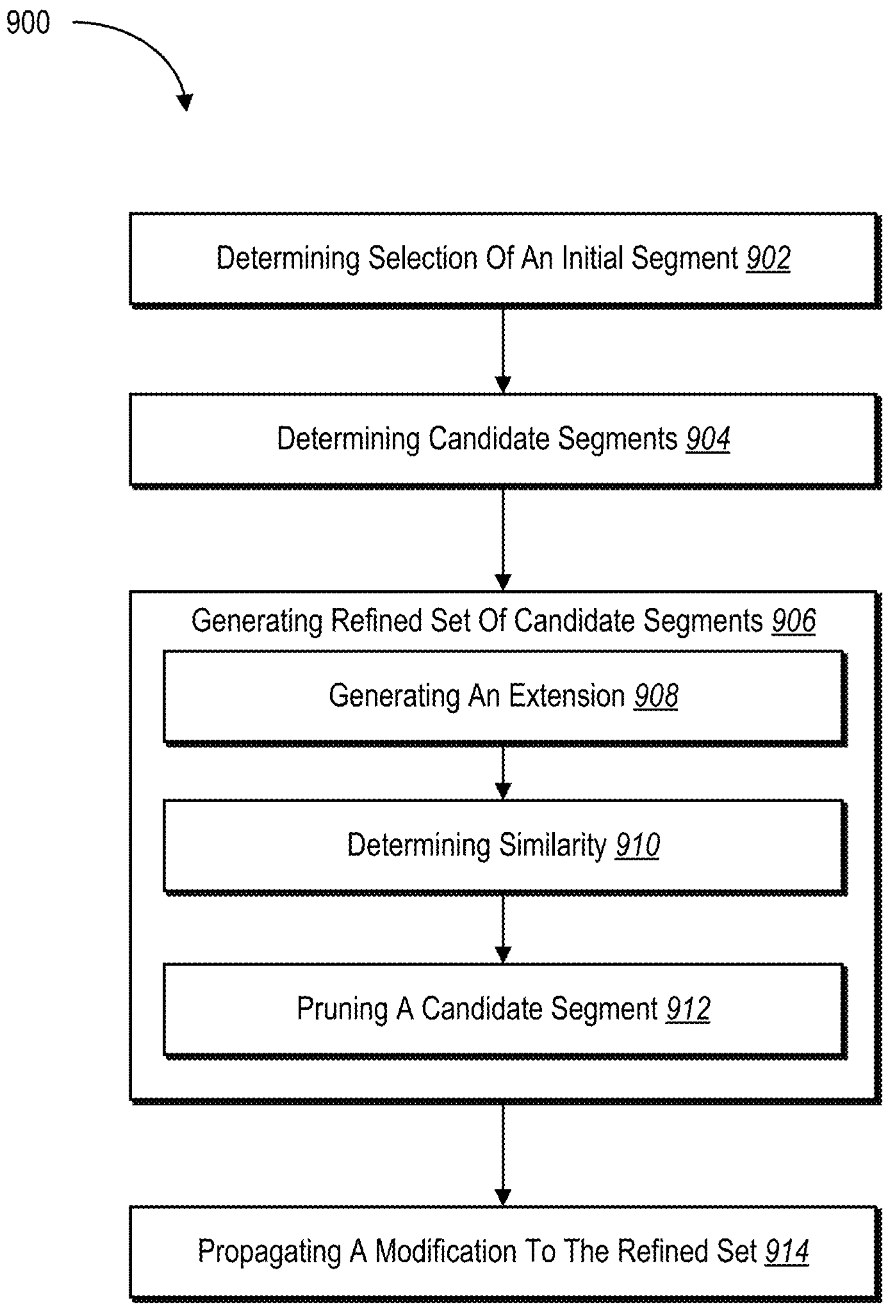
FIG. 9 illustrates a flowchart of a series of acts for receiving an approximate selection of a segment and contemporaneously propagating modifications made to the segment in accordance with one or more embodiments.

While FIG. 9 illustrates acts according to particular embodiments, alternative embodiments may omit, add to, reorder, and/or modify any of the acts shown in FIG. 9. The acts of FIG. 9 are be performed as part of a method. Alternatively, a non-transitory computer readable medium comprises instructions, that when executed by one or more processors, cause a computing device to perform the acts of FIG. 9. In still further embodiments, a system performs the acts of FIG. 9. Additionally, the acts described herein may be repeated or performed in parallel with one another or in parallel with different instances of the same or other similar acts.

FIG. 9 illustrates an example series of acts 900 for contemporaneously propagating modifications made to a user-selected segment in a vector graphic to similar segments within the vector graphic. In particular, the series of acts 900 includes an act 902 of determining an initial segment. For example, the act 902 involves detecting a selection of an initial segment of a vector graphic.

In addition, the series of acts 900 includes an act 904 of determining candidate segments. For example, the act 904 involves generating, in response to a selection, a set of candidate segments from a vector graphic that are within a threshold similarity in relation to an initial segment. In some embodiments, the act 904 involves determining, in response to a selection of an initial segment of a vector graphic, a set of candidate segments of the vector graphic that are within a threshold similarity in relation to the initial segment.

In some cases, the act 904 involves determining and/or performing a translation from a candidate segment to an initial segment, determining and/or performing a scale transformation from a candidate to an initial segment, and determining and/or performing a rotation from the candidate segment to the initial segment. For example, in some cases, performing the scale transformation further includes resizing a candidate segment to align with the size of an initial segment.

In some embodiments, determining the rotation from a candidate segment to an initial segment comprises determining a rotation angle of an anchor point within the candidate segment to a corresponding anchor point within the initial segment. In some embodiments, performing a rotation includes determining a rotation angle of a single anchor point within a candidate segment to align with a corresponding anchor point within an initial segment, and not determining rotation angles for other anchor points within the candidate segment.

As shown, the series of acts 900 includes an act 906 of generating a refined set of candidate segments. For example, the act 906 of generating a refined set of candidate segments involves pruning, from a set of candidate segments, candidate segments with extensions that fail to satisfy a threshold similarity. In some embodiments, the act 906 involves generating an extension for a candidate segment from among a set of candidate segments by extending the candidate segment to include an additional anchor point, generating a transformed extension by performing one or more of translation, scaling, or rotation to the extension to align with an extended version of an initial segment, and determining that the transformed extension is within a threshold similarity in relation to the extended version of the initial segment. In other embodiments, the act 906 includes transforming an extension of a candidate segment within a set of candidate segments to align with an extended version of an initial segment, determining that the extension does not satisfy a threshold similarity after transforming to align with the extended version of the initial segment, and in response to determining that the extension does not satisfy the threshold similarity, pruning the candidate segment from the set of candidate segments.

In some cases, the act 906 involves pruning candidate segments whose extensions fail to satisfy a threshold similarity by pruning over a number of iterations up to an iteration that results in no remaining candidate segments. In other cases, the act 906 involves generating a refined set of candidate segments by implementing pruning iterations to remove candidate segments from a set of candidate segments until a threshold percentage of candidate segments have been pruned.

To elaborate, in some cases, the act 906 includes one or more constituent acts, such as an act 908 of generating an extension, an act 910 of determining similarity, and an act 910 of pruning a candidate segment.

In one or more embodiments, the act 908 involves generating an extension for a candidate segment from among a set of candidate segments. In particular, the act 908 involves generating an extension for a candidate segment from among a set of candidate segments. In some embodiments, the act 908 includes extending an initial segment along a Bezier spline to include an additional anchor point adjacent to an anchor point of the initial segment. In some cases, the act 908 includes generating an extension of a candidate segment by extending the candidate segment to include an additional anchor point adjacent to an anchor point of the candidate segment. In other cases, the act 908 involves extending a candidate segment in a first direction along a Bezier spline to include a first additional anchor point adjacent to a first anchor point of the candidate segment and extending the candidate segment in a second direction along the Bezier spline to include a second additional anchor point adjacent to a second anchor point of the candidate segment.

In some cases, the act 910 of determining similarity involves determining that an extension is not within a threshold similarity in relation to an extended version of an initial segment. In other cases, the act 906 involves determining that an extension of a candidate segment is not within a threshold similarity in relation to an extended version of an initial segment. In some embodiments, determining that the extension of the candidate segment is not within the threshold similarity in relation to the extended version of the initial segment further involves generating a transformed extension by performing one or more of translation, scaling, or rotation to an extension for aligning with the extended version of the initial segment and comparing the transformed extension with the extended version of the initial segment. In other embodiments, the act 910 includes transforming an extension by performing one or more of translation, scaling, or rotation to align with an extended version of an initial segment, and in response to transforming the extension, comparing the extension with an extended version of the initial segment to determine a similarity score.

In some embodiments, the act 912 of pruning a candidate segment involves pruning a candidate segment from a set of candidate segments based on determining that an extension is not within a threshold similarity. In some cases, the act 912 includes pruning a candidate segment from a set of candidate segments in a first pruning iteration and pruning an additional candidate segment from the set of candidate segments in a second pruning iteration.

Furthermore, the series of acts 900 includes an act 914 of propagating a modification to a refined set. For example, the act 914 involves, in response to a user interaction applying a modification to an initial segment, propagating a modification to a refined set of candidate segments. In some embodiments, the act 914 involves receiving, from a client device, an indication of a user interaction applying a modification to an initial segment by receiving data from a client device indicating an augmentation to a shape of the initial segment and propagating a modification to a refined set of candidate segments by augmenting, contemporaneously with the user interaction modifying the initial segment, a shape of a candidate segment within the refined set of candidate segments to match the augmentation to the shape of the initial segment. In some cases, the act 914 includes receiving, from a client device, an indication of an augmentation to a shape of an initial segment and in response to the indication, augmenting a shape of an additional candidate segment within a refined set of candidate segments to match the augmentation to the shape of the initial segment.

Embodiments of the present disclosure may comprise or use a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
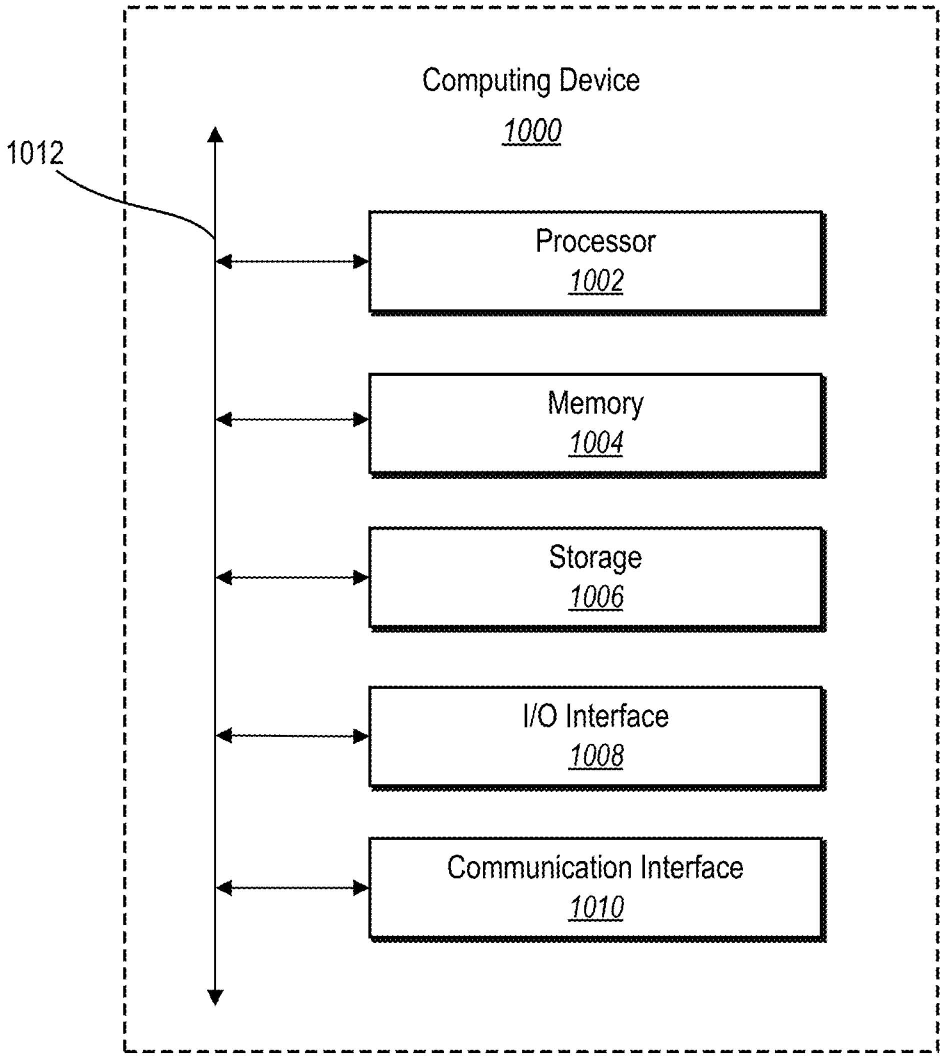
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server device(s) 104, and/or client device(s) 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

determining, based on detecting a selection of an initial segment of a vector graphic, a first geometric region of the vector graphic, the initial segment forming a portion of the first geometric region of the vector graphic;

determining, in response to the selection, one or more additional geometric regions of the vector graphic that are within a threshold similarity in relation to the first geometric region;

receiving a user interaction to apply a modification to a geometry of the first geometric region of the vector graphic at the initial segment; and in response to receiving the user interaction, applying the modification to the geometry of the first geometric region of the vector graphic and the one or more additional geometric regions contemporaneously.

2. The computer-implemented method of claim 1, further comprising:

determining a set of candidate segments by:

determining a translation from a candidate segment to the initial segment;

determining a scale transformation from the candidate segment to the initial segment; and determining a rotation from the candidate segment to the initial segment; and determining the one or more additional geometric regions from the set of candidate segments.

3. The computer-implemented method of claim 2, wherein determining the rotation from the candidate segment to the initial segment comprises determining a rotation angle of an anchor point within the candidate segment to a corresponding anchor point within the initial segment.

4. The computer-implemented method of claim 1, further comprising generating a refined set of candidate segments by:

generating an extension for a candidate segment from among a set of candidate segments by extending the candidate segment to include an additional anchor point;

generating a transformed extension by performing one or more of translation, scaling, or rotation to the extension to align with an extended version of the initial segment; and determining that the transformed extension is within the threshold similarity in relation to the extended version of the initial segment.

5. The computer-implemented method of claim 1, further comprising:

receiving, from a client device, an indication of the user interaction applying the modification to the initial segment by receiving data from the client device indicating an augmentation to a shape of the initial segment; and propagating the modification to a refined set of candidate segments by augmenting, contemporaneously with the user interaction modifying the initial segment, a shape of a candidate segment within the refined set of candidate segments to match the augmentation to the shape of the initial segment.

6. The computer-implemented method of claim 1, further comprising generating a refined set of candidate segments by:

transforming an extension of a candidate segment within a set of candidate segments to align with an extended version of the initial segment;

determining that the extension does not satisfy the threshold similarity after transforming to align with the extended version of the initial segment; and in response to determining that the extension does not satisfy the threshold similarity, pruning the candidate segment from the set of candidate segments.

7. The computer-implemented method of claim 1, further comprising generating a refined set of candidate segments by pruning candidate segments whose extensions fail to satisfy the threshold similarity by pruning over a number of iterations up to an iteration that results in no remaining candidate segments.

8. A non-transitory computer readable medium storing executable instructions which, when executed by a processing device, cause the processing device to perform operations comprising:

determining, based on detecting a selection of an initial segment of a vector graphic, a first geometric region of the vector graphic, the initial segment forming a portion of the first geometric region of the vector graphic;

determining, in response to the selection, one or more additional geometric regions of the vector graphic that are within a threshold similarity in relation to the first geometric region;

receiving a user interaction to apply a modification to a geometry of the first geometric region of the vector graphic at the initial segment; and in response to receiving the user interaction, applying the modification to the geometry of the first geometric region of the vector graphic and the one or more additional geometric regions contemporaneously.

9. The non-transitory computer readable medium of claim 8, wherein the operations further comprise determining the first geometric region of the vector graphic from the initial segment by generating one or more extensions for the initial segment by adding one or more adjacent segments to the initial segment.

10. The non-transitory computer readable medium of claim 8, wherein the operations further comprise:

determining a set of candidate segments by performing one or more of:

a translation from a candidate segment of the set of candidate segments to the initial segment;

a scale transformation from the candidate segment to the initial segment; or a rotation from the candidate segment to the initial segment; and determining the one or more additional geometric regions from the set of candidate segments.

11. The non-transitory computer readable medium of claim 10, wherein performing the scale transformation comprises resizing the candidate segment to align with a size of the initial segment.

12. The non-transitory computer readable medium of claim 10, wherein performing the rotation comprises:

determining a rotation angle of a single anchor point within the candidate segment to align with a corresponding anchor point within the initial segment; and not determining rotation angles for other anchor points within the candidate segment.

13. The non-transitory computer readable medium of claim 8, further comprising generating an extension of a candidate segment of a set of candidate segments by extending the candidate segment to include an additional anchor point adjacent to an anchor point of the candidate segment.

14. The non-transitory computer readable medium of claim 8, wherein the operations further comprise determining that an extension of a candidate segment of a set of candidate segments is not within a threshold similarity in relation to an extended version of the initial segment comprises:

generating a transformed extension by performing one or more of translation, scaling, or rotation to the extension for aligning with the extended version of the initial segment; and comparing the transformed extension with the extended version of the initial segment.

15. A system comprising:

one or more memory devices comprising a vector graphic and a vector similarity algorithm; and one or more processors configured to cause the system to:

determine, in response to a selection of an initial segment of a vector graphic forming a portion of a first geometric region of the vector graphic, the first geometric region of the vector graphic and a set of candidate segments of the vector graphic that are within a threshold similarity in relation to the initial segment;

determine, based on the set of candidate segments, one or more additional geometric regions of the vector graphic that are within a threshold similarity in relation to the first geometric region;

receive a user interaction to apply a modification to a geometry of the first geometric region of the vector graphic at the initial segment; and in response to receiving the user interaction, applying the modification to the geometry of the first geometric region of the vector graphic and the one or more additional geometric regions contemporaneously.

16. The system of claim 15, wherein the one or more processors are further configured to cause the system to generate an extension for a candidate segment from among the set of candidate segments by:

extending the candidate segment in a first direction along a Bezier spline to include a first additional anchor point adjacent to a first anchor point of the candidate segment; and extending the candidate segment in a second direction along the Bezier spline to include a second additional anchor point adjacent to a second anchor point of the candidate segment.

17. The system of claim 15, wherein the one or more processors are further configured to cause the system to:

receive, from a client device, an indication of an augmentation to a shape of the initial segment; and in response to the indication, augment a shape of an additional candidate segment within a refined set of candidate segments to match the augmentation to the shape of the initial segment.

18. The system of claim 15, wherein the one or more processors are further configured to cause the system to generate an extended version of the initial segment by extending the initial segment along a Bezier spline to include an additional anchor point adjacent to an anchor point of the initial segment.

19. The system of claim 15, wherein the one or more processors are further configured to cause the system to generate a refined set of candidate segments by:

pruning a candidate segment from the set of candidate segments in a first pruning iteration; and pruning an additional candidate segment from the set of candidate segments in a second pruning iteration.

20. The system of claim 15, wherein the one or more processors are further configured to cause the system to determine that an extension is not within the threshold similarity in relation to an extended version of the initial segment by:

transforming the extension by performing one or more of translation, scaling, or rotation to align with the extended version of the initial segment; and in response to transforming the extension, comparing the extension with the extended version of the initial segment to determine a similarity score.

* * * * *